(12) United States Patent
Friedman et al.

(10) Patent No.: US 11,204,648 B2
(45) Date of Patent: Dec. 21, 2021

(54) HANDSHAKE TO ESTABLISH AGREEMENT BETWEEN TWO PARTIES IN VIRTUAL REALITY

(71) Applicant: MASTERCARD INTERNATIONAL INCORPORATED, Purchase, NY (US)

(72) Inventors: Michael Jason Friedman, Stamford, CT (US); Derek Humphreys, Lucan (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 193 days.

(21) Appl. No.: 16/006,560

(22) Filed: Jun. 12, 2018

(65) Prior Publication Data
US 2019/0377417 A1    Dec. 12, 2019

(51) Int. Cl.
*G06F 3/01*      (2006.01)
*H04L 29/06*   (2006.01)
*G06Q 20/34*   (2012.01)

(52) U.S. Cl.
CPC .............. *G06F 3/017* (2013.01); *G06F 3/011* (2013.01); *G06F 3/016* (2013.01); *G06Q 20/341* (2013.01); *H04L 67/38* (2013.01); *H04L 67/42* (2013.01)

(58) Field of Classification Search
CPC .......... G06F 3/016; G06F 21/31; G06F 3/011; G06F 3/014; G06F 3/017; G06F 3/039;
(Continued)

(56) References Cited

U.S. PATENT DOCUMENTS 6,636,833 B1   10/2003   Flitcroft et al.
7,136,835 B1   11/2006   Flitcroft et al.
(Continued)

FOREIGN PATENT DOCUMENTS

WO   WO2007096648 A1   8/2007
WO   WO2019118086 A1   6/2019
WO   WO2019125621 A1   6/2019

OTHER PUBLICATIONS

Vrgluv, LLC, VRgluv—Force Feedback Haptic Gloves for VR, pp. 1-5, downloaded Oct. 18, 2017, www.vrgluv.com.
(Continued)

*Primary Examiner* — Jennifer N Welch
*Assistant Examiner* — Reji Kartholy
(74) *Attorney, Agent, or Firm* — Otterstedt, Wallace & Kammer, LLP

(57) ABSTRACT

With a virtual/augmented reality environment management server, first and second computer display devices associated with first and second remote client computing devices are caused to each display first and second avatars in at least one of a virtual reality environment and an augmented reality environment. The avatars represent first and second human users of the remote client computing devices. At the virtual/augmented reality environment management server, data is obtained indicating that a predetermined gesture sequence has occurred between the avatars; in reliance on the data, the virtual/augmented reality environment management server causes an authentication/transaction management server to take at least one action outside the at least one of a virtual reality environment and an augmented reality environment; and causes a confirmation at the first and second remote client computing devices, that the action taken in reliance on the data indicating that the predetermined gesture sequence has occurred.

18 Claims, 13 Drawing Sheets

(58) Field of Classification Search
CPC ..... G06F 3/0481; G06F 3/0488; G06N 20/00;
G06N 5/025; G06Q 20/202; G06Q
20/322; G06Q 20/34; G06Q 20/341;
G06Q 20/401; G06Q 20/4012; G06Q
20/40145; G06Q 20/405; G06Q 2220/00;
G06Q 30/0641; H04L 63/0861; H04L
63/1408; H04L 63/1441; H04L 67/02;
H04L 67/38; H04L 67/42

See application file for complete search history.

(56) References Cited

U.S. PATENT DOCUMENTS

| | | | |
|---|---|---|---|
| 7,929,805 | B2 | 4/2011 | Wang et al. |
| 8,294,557 | B1 | 10/2012 | El Saddik |
| 8,719,952 | B1 | 5/2014 | Damm-Goossens |
| 8,739,260 | B1 | 5/2014 | Damm-Goossens |
| 9,767,263 | B1 | 9/2017 | Mcinerny |
| 2002/0138562 | A1 | 9/2002 | Wies |
| 2003/0098803 | A1 | 5/2003 | Gourgey et al. |
| 2006/0134586 | A1 | 6/2006 | Armingaud et al. |
| 2010/0058470 | A1 | 3/2010 | Kim |
| 2010/0100480 | A1 | 4/2010 | Altman et al. |
| 2010/0277411 | A1* | 11/2010 | Yee ............... G06K 9/00912 345/156 |
| 2011/0155044 | A1 | 6/2011 | Burch et al. |
| 2011/0246329 | A1* | 10/2011 | Geisner ............... G06F 3/017 705/27.1 |
| 2011/0251952 | A1 | 10/2011 | Kelly et al. |
| 2011/0264491 | A1 | 10/2011 | Birnbaum |
| 2012/0137403 | A1 | 6/2012 | Bone |
| 2012/0197788 | A1 | 8/2012 | Sanghvi et al. |
| 2012/0323700 | A1 | 12/2012 | Aleksandrovich |
| 2013/0069772 | A1 | 3/2013 | Najafi et al. |
| 2013/0086389 | A1 | 4/2013 | Suwald |
| 2013/0160095 | A1 | 6/2013 | Seleznyov |
| 2013/0205386 | A1 | 8/2013 | Thompson |
| 2013/0290177 | A1 | 10/2013 | Milam et al. |
| 2013/0311362 | A1 | 11/2013 | Milam et al. |
| 2014/0237392 | A1* | 8/2014 | Hoomani ............... A63F 13/31 715/757 |
| 2014/0250538 | A1 | 9/2014 | Rapaport |
| 2015/0082401 | A1 | 3/2015 | Gupta et al. |
| 2015/0242601 | A1 | 8/2015 | Giffilhs |
| 2015/0248162 | A1 | 9/2015 | Masson |
| 2015/0319153 | A1 | 11/2015 | Tartz |
| 2016/0028730 | A1 | 1/2016 | Natarajan |
| 2016/0042324 | A1* | 2/2016 | Johnson ............ G06Q 10/1095 705/7.19 |
| 2016/0180083 | A1 | 6/2016 | Costigan |
| 2016/0224783 | A1 | 8/2016 | Jakobsson |
| 2016/0302065 | A1 | 10/2016 | Bansal |
| 2017/0090569 | A1 | 3/2017 | Levesque |
| 2017/0091976 | A1* | 3/2017 | O'Sullivan ............ G06T 13/40 |
| 2017/0093864 | A1 | 3/2017 | Pestun |
| 2017/0094636 | A1 | 3/2017 | Fadell et al. |
| 2017/0153702 | A1 | 6/2017 | Abrahams |
| 2017/0163647 | A1 | 6/2017 | Cernoch |
| 2017/0178272 | A1 | 6/2017 | Lashkari et al. |
| 2017/0249794 | A1 | 8/2017 | Davis |
| 2017/0316717 | A1 | 11/2017 | Aly |
| 2019/0187859 | A1 | 6/2019 | Friedman et al. |
| 2019/0196588 | A1 | 6/2019 | Friedman et al. |
| 2019/0287083 | A1* | 9/2019 | Wurmfeld ............... G06F 3/017 |
| 2019/0379765 | A1* | 12/2019 | Fajt ..................... A63F 13/55 |

OTHER PUBLICATIONS

Vrgluv, LLC, VRgluv—Force Feedback Gloves for Virtual Reality, pp. 1-10, downloaded Dec. 9, 2017, www.vrgluv.com.

Virtuix, Virtuix Omni first of its kind active virtual reality motion platform, pp. 1-3 downloaded Oct. 18, 2017 from www.virtuix.com/.

Tactai, Introducing Tactai Touch, downloaded Jul. 18, 2017 from http://tactai.com/, pp. 1-3.

Google, reCAPTCHA: Easy on Humans, Hard on Bots, downloaded Jul. 18, 2017 from https://www.google.com/recaptcha/intro/, pp. 1-7.

Mastercard International Incorporated, MasterCard In Control™ is the perfect tool for you to stay protected, p. 1, Downloaded Aug. 18, 2017 From www.mastercard.com.

Digital Trends, Manus VR gloves let you reach out and touch the future_Digital Trends, By Will Fulton—Posted on Mar. 24, 2016, downloaded Oct. 18, 2017 from https://www.digitaltrends.com/virtual-reality/manus-vr-gloves-hands-in/, pp. 1-5.

Manus VR, Manus VR_The Pinnacle of Virtual Reality Controllers_, pp. 1-4, downloaded Dec. 9, 2017 from manus-vr.com/.

Wikipedia, Haptic technology, downloaded May 24, 2017 from https://en.wikipedia.org/wiki/Haptic_technology, pp. 1-12.

Glider Gloves_#1 Rated Touch Screen Gloves on the Planet, pp. 1-7 downloaded Dec. 8, 2017 from https://www.glidergloves.com/.

Virtuix, E3 and Omni Cable_Virtuix Omni, pp. 1-7 downloaded Dec. 9, 2017 from www.virtuix.com/.

Manus VR, Product Information Datasheet, Development Kit—Version 1.1—Apr. 2017, pp. 1-5, downloaded Dec. 9, 2017 from www.manus-vr.com.

Peter Mell and Timothy Grance, The NIST Definition of Cloud Computing, NIST Special Publication 800-145, Sep. 2011, cover, pp. i-iii and 1-3.

Catherine A. Todd et al., An Audio Haptic Tool for Visually Impaired Web Users, J. Emerging Trends in Computing Information Sciences, v. 3 n. 8, Aug. 2012 pp. 1136-1145.

Wikipedia, Microsoft HoloLens, pp. 1-9, Downloaded Mar. 27, 2018 https://en.wikipedia.org/wiki/Microsoft_HoloLens, page was last edited on Mar. 9, 2018.

Wikipedia, Kinect, Downlaoded Jan. 26, 2018 From https://en.wikipedia.org/wiki/Kinect, pp. 1-20, page was last edited on Jan. 12, 2018.

Wikipedia, CAPTCHA, pp. 1-8 Downloaded Sep. 3, 2017 From https://en.wikipedia.org/wiki/CAPTCHA.

Wikipedia, reCAPTCHA, pp. 1-6 Downloaded Sep. 3, 2017 From https://en.wikipedia.org/wiki/ReCAPTCHA.

Educational System Federal Credit Union, Online Banking Login Instructions, pp. 1-4, Downloaded Sep. 3, 2017 From www.esfcu.org.

Android Apps On Google Play, Pattern Lock Screen, Downloaded Sep. 3, 2017 From https://play.google.com/store/apps, pp. 1-3, Last Updated Mar. 9, 2017.

Authorized Officer Sang Bum Chin, Korean IP Office, Written Opinion of the ISR, PCT Appln PCT/US2018/059332, dated Mar. 4, 2019, pp. 1-13.

Volker Roth and Kai Richter, "How To Fend Off Shoulder Surfing", published by Journal of Banking & Finance (in 2006), available online Nov. 2, 2005, and presented at 11th ACM Conference on Computerand Communications Security (Year: 2005) pp. 1727-1751.

* cited by examiner

HANDSHAKE TO ESTABLISH AGREEMENT BETWEEN TWO PARTIES IN VIRTUAL REALITY

FIELD OF THE INVENTION

The present invention relates generally to the use of virtual reality technology, including haptic and/or computer vision technology, in the electronic and computer arts, and, more particularly, but not exclusively, to use of haptic technology, computer vision technology, and/or related stimuli in electronic commerce and the like.

BACKGROUND OF THE INVENTION

Virtual reality (VR) provides computer-generated simulations of realistic experiences. Augmented reality (AR) systems are, in essence, a form of VR that layers virtual information over a live camera feed (i.e., of actual reality) into a headset, through a smartphone or tablet device, or the like.

Haptic communication recreates the sense of touch by applying forces, vibrations, and/or motions to a user. Uses include assistance in the creation of virtual objects in a computer simulation, control of such virtual objects, and enhancement of the remote control of machines and devices. Haptic devices may incorporate tactile sensors that measure forces exerted by the user on the interface.

In virtual reality systems, haptics add the sense of touch to previous visual-only interfaces. Haptics may be useful for those who are visually impaired, but can also provide an enhanced user experience for those having unimpaired vision.

Computer vision includes scene reconstruction, event detection, video tracking, object recognition, three-dimensional (3D) pose estimation, learning, indexing, motion estimation, image restoration, and the like.

SUMMARY OF THE INVENTION

Principles of the present invention provide techniques for a handshake to establish agreement between two parties in virtual reality. In one aspect, an exemplary method, according to an aspect of the invention, includes causing, with a virtual/augmented reality environment management server, first and second computer display devices associated with first and second remote client computing devices to each display first and second avatars in at least one of a virtual reality environment and an augmented reality environment. The first and second avatars represent first and second human users of the first and second remote client computing devices. Further steps include obtaining, at the virtual/augmented reality environment management server, data indicating that a predetermined gesture sequence has occurred between the first and second avatars; in reliance on the data indicating that the predetermined gesture sequence has occurred between the first and second avatars, the virtual/augmented reality environment management server causing an authentication/transaction management server to take at least one action outside the at least one of a virtual reality environment and an augmented reality environment; and causing a confirmation, with the virtual/augmented reality environment management server, at the first and second remote client computing devices, that the action taken in reliance on the data indicating that the predetermined gesture sequence has occurred.

In another aspect, an exemplary virtual/augmented reality environment management server, according to another aspect of the invention, is configured to interface with an authentication/transaction management server and a plurality of remote client computing devices. The virtual/augmented reality environment management server includes a memory; an interface to the authentication/transaction management server and the plurality of remote client computing devices; and at least one processor, coupled to the memory and the interface. The at least one processor is operative to cause first and second computer display devices associated with first and second ones of the remote client computing devices to each display first and second avatars in at least one of a virtual reality environment and an augmented reality environment. The first and second avatars represent first and second human users of the first and second remote client computing devices. The at least one processor is further operative to obtain data indicating that a predetermined gesture sequence has occurred between the first and second avatars; in reliance on the data indicating that the predetermined gesture sequence has occurred between the first and second avatars, to cause the authentication/transaction management server to take at least one action outside the at least one of a virtual reality environment and an augmented reality environment; and to cause a confirmation at the first and second ones of the remote client computing devices, of the action taken in reliance on the data indicating that the predetermined gesture sequence has occurred.

In still another aspect, another exemplary method, according to still another aspect of the invention, includes obtaining, from a remote virtual/augmented reality environment management server, at a client computing device having an associated computer display device, instructions causing the computer display device to display first and second avatars in at least one of a virtual reality environment and an augmented reality environment. The first and second avatars respectively represent a human user of the client computing device and a remote human user in the at least one of a virtual reality environment and an augmented reality environment. A further step includes providing, to the remote virtual/augmented reality environment management server, from the client computing device, at least a portion of data indicating that a predetermined gesture sequence has occurred between the first and second avatars, to cause the remote virtual/augmented reality environment management server, in reliance on the at least portion of data indicating that the predetermined gesture sequence has occurred between the first and second avatars, to in turn cause an authentication/transaction management server to take at least one action outside the at least one of a virtual reality environment and an augmented reality environment. Still further steps include obtaining, from the remote virtual/augmented reality environment management server, at the client computing device, a confirmation of the action taken in reliance on the data indicating that the predetermined gesture sequence has occurred; and providing to the human user of the client computing device, based on the confirmation, at least one of a visual indication, an audio indication, and a haptic indication.

In a further aspect, an exemplary client computing device, according to a further aspect of the invention, includes a memory; and at least one processor, coupled to the memory, and operative to obtain, from a remote virtual/augmented reality environment management server, instructions causing a computer display device associated with the client computing device to display first and second avatars in at least one of a virtual reality environment and an augmented reality environment. The first and second avatars respectively represent a human user of the client computing device and a remote human user in the at least one of a virtual reality environment and an augmented reality environment. The at least one processor is further operative to provide, to the remote virtual/augmented reality environment management server, from the client computing device, at least a portion of data indicating that a predetermined gesture sequence has occurred between the first and second avatars, to cause the remote virtual/augmented reality environment management server, in reliance on the at least portion of data indicating that the predetermined gesture sequence has occurred between the first and second avatars, to in turn cause an authentication/transaction management server to take at least one action outside the at least one of a virtual reality environment and an augmented reality environment. The at least one processor is still further operative to obtain, from the remote virtual/augmented reality environment management server, at the client computing device, a confirmation of the action taken in reliance on the data indicating that the predetermined gesture sequence has occurred; and to provide to the human user of the client computing device, based on the confirmation, at least one of a visual indication, an audio indication, and a haptic indication.

Aspects of the invention contemplate the method(s) described herein performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps (e.g., when instructions from a persistent storage device are loaded into the memory to configure the processor). Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the invention can provide substantial beneficial technical effects, such as:
enabling a universally-understood mechanism for agreement, initiation, and/or conclusion;
secure and effective mechanism for identification between and among two or more parties.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Payment Devices and Associated Payment Processing Networks

Figure 1:
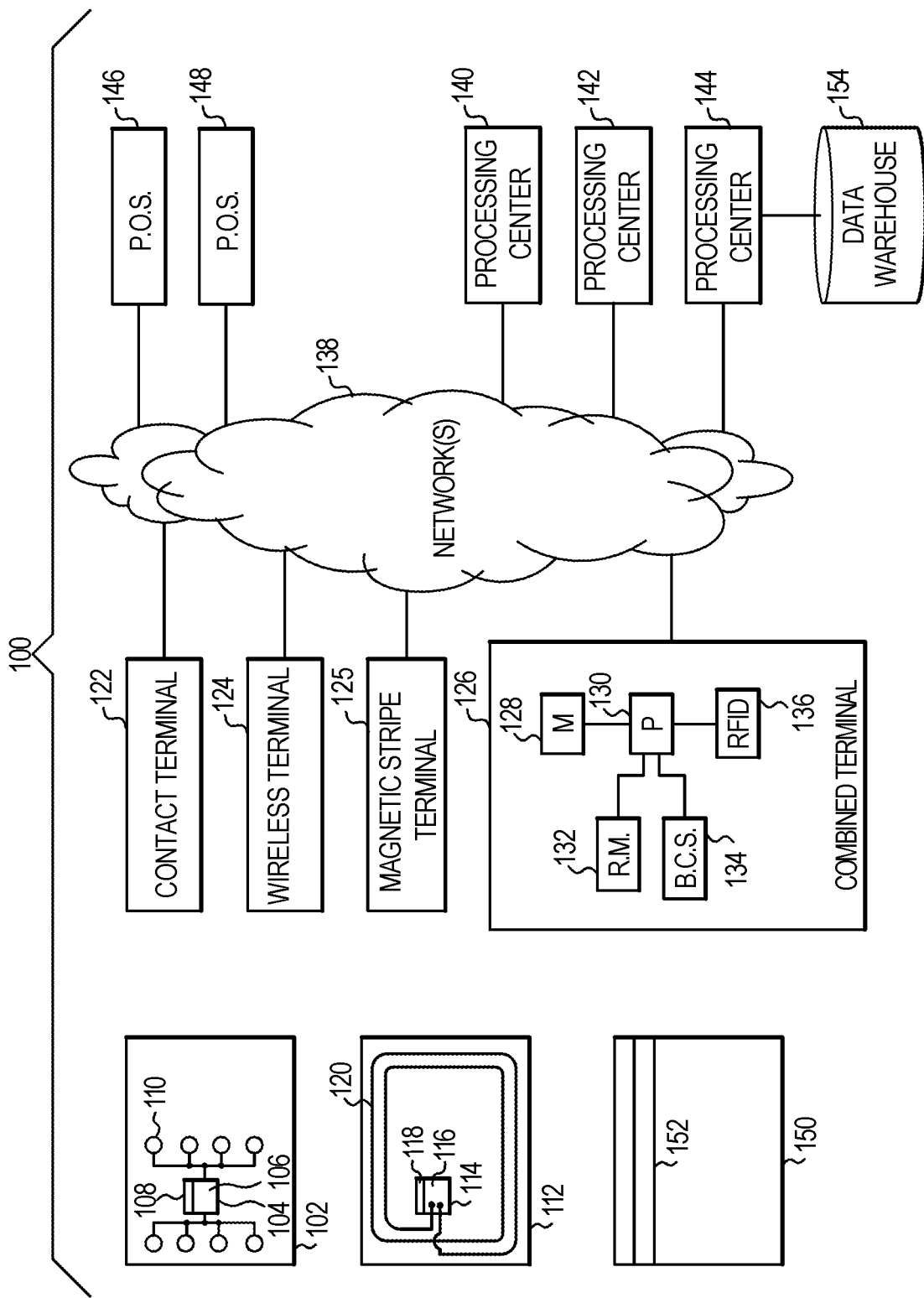
FIG. 1 shows an example of a system and various components thereof that can implement at least a portion of some techniques of the invention.

With regard to payment card and similar payments, attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system 100 typically functions with other types of devices in lieu of or in addition to "smart" or "chip" cards 102, 112; for example, a conventional card 150 having a magnetic stripe 152. Furthermore, an appropriately configured mobile device (e.g., "smart" cellular telephone handset, tablet, personal digital assistant (PDA), and the like) can be used to carry out contactless payments in some instances; for example, via near field communications (NFC), wherein the appropriately configured mobile device acts like a contactless card 112 (or, with an electronic wallet present, like multiple such cards).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions of units 108, 118 can store the operating system of the cards 102, 112. The operating system loads and executes applications and provides file management or other basic card services to the applications. One operating system that can be used is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

The skilled artisan will also be familiar with the Mastercard® Contactless specifications (the skilled artisan will appreciate that MASTERCARD CONTACTLESS was formerly known as MASTERCARD PAYPASS), available under license from Mastercard International Incorporated of Purchase, N.Y., USA (marks of Mastercard International Incorporated of Purchase, N.Y., USA).

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment or the like. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone, tablet, or the like.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 150. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can optionally be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

It should be noted that the system depicted in FIG. 1 may involve not only conventional transactions at "brick and mortar" merchants, but also, card-not-present transactions, such as card-not-present Internet transactions or card-not-present recurring payments. In some instances, an Internet Protocol (IP) address may be captured during card-not-present Internet transactions. In exemplary card-not-present Internet transactions, an individual utilizes his or her home computer to communicate with a server of an e-commerce merchant over the Internet. The individual provides his or her PAN to the merchant's server. The merchant utilizes the PAN to initiate an authorization request, and upon receiving an authorization request response indicating approval, will complete the e-commerce transaction. In exemplary card-not-present recurring payments, an individual provides his or her PAN and related data to a merchant (e.g., via phone or postal mail). The merchant utilizes the PAN to initiate an authorization request, and upon receiving an authorization request response indicating approval, will complete the recurring transaction. It should be noted that one or more embodiments are applicable to both token-based transactions (see, e.g., "EMV® Payment Tokenisation Specification: Technical Framework," Version 1.0, March 2014, EMVCo, LLC ("EMVCo"), expressly incorporated herein by reference in its entirety for all purposes) and PAN-based transactions.

In some cases, there can be payment card accounts which do not have physical cards or other physical payment devices associated therewith; for example, a customer can be provided with a PAN, expiration date, and security code but no physical payment device, and use same, for example, for card-not-present telephone or internet transactions. In this regard, a "cardholder" should be understood to refer to the account holder of a payment card account, regardless of whether the holder actually has a physical payment card or other physical payment device.

Figure 2:
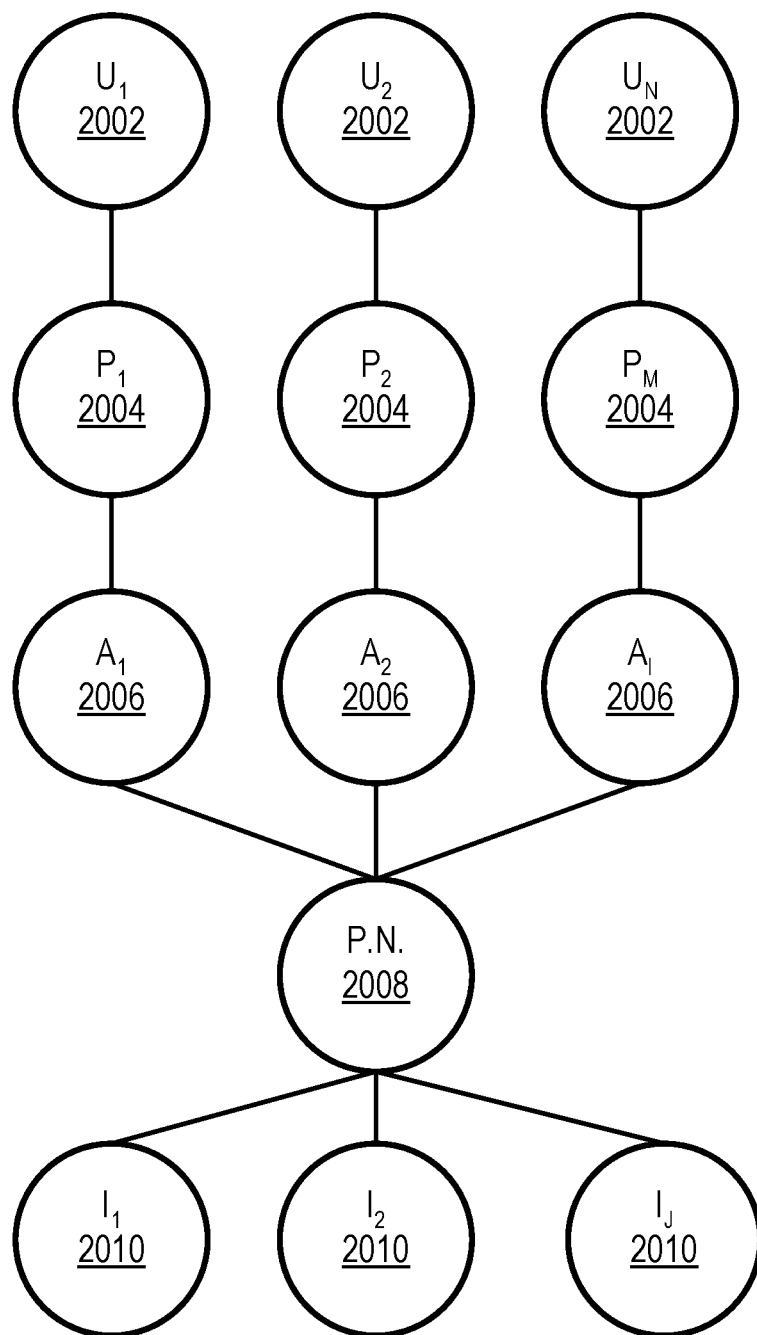
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers, useful in connection with one or more embodiments of the invention.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, Mastercard International Incorporated, operator of the BANKNET® network, or Visa International Service Association, operator of the VISANET® network. In general, N, M, I, and J are integers that can be equal or not equal. Note also that elements 2006, 2010 represent the entities that actually carry out processing for the acquirers and issuers respectively; in some instances, these entities carry out their own processing; in other entities, they utilize acquirer processors and issuer processors, respectively.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed in relation to payment card accounts using other kinds of payment networks, for example, proprietary or closed payments networks with only a single issuer and acquirer. Furthermore in this regard, FIG. 2 depicts a four party model, as will be known to the skilled artisan; the four parties are the consumer 2002, merchant 2004, acquirer 2006, and issuer 2010. However, at least some embodiments are also of use with three-party models, wherein the acquirer and issuer are the same entity.

Messages within a network such as network 138 and/or network 2008, may, in at least some instances, conform to the International Organization for Standardization (ISO) Standard 8583, *Financial transaction card originated messages—Interchange message specifications*, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)
ISO 8583 Part 2: Application and registration procedures for Institution Identification Codes (IIC) (1998)
ISO 8583 Part 3: Maintenance procedures for messages, data elements and code values (2003)
ISO 8583:1993 (1993)
ISO 8583:1987 (1987)

As used herein, a "payment card network" is a communications network that uses payment card account numbers, such as primary account numbers (PANs), to authorize, and to facilitate clearing and settlement of, payment card transactions for credit, debit, stored value and/or prepaid card accounts. The card accounts have standardized payment card account numbers associated with them, which allow for efficient routing and clearing of transactions; for example, ISO standard account numbers such as ISO/IEC 7812-compliant account numbers. The card accounts and/or account numbers may or may not have physical cards or other physical payment devices associated with them. For example, in some instances, organizations have purchasing or procurement card accounts to which a payment card account number is assigned, used for making purchases for the organization, but there is no corresponding physical card. In other instances, "virtual" account numbers are employed; this is also known as PAN mapping. The PAN mapping process involves taking the original Primary Account Number (PAN)(which may or may not be associated with a physical card) and issuing a pseudo-PAN (or virtual card number) in its place. Commercially available PAN-mapping solutions include those available from Orbiscom Ltd., Block 1, Blackrock Business Park, Carysfort Avenue, Blackrock, Co. Dublin, Ireland (now part of Mastercard International Incorporated of Purchase, N.Y., USA); by way of example and not limitation, techniques of U.S. Pat. Nos. 6,636,833 and 7,136,835 of Flitcroft et al., the complete disclosures of both of which are expressly incorporated herein by reference in their entireties for all purposes.

Some payment card networks connect multiple issuers with multiple acquirers; others use a three party model. Some payment card networks use ISO 8583 messaging. Non-limiting examples of payment card networks that connect multiple issuers with multiple acquirers are the BANKNET® network and the VISANET® network. One or more embodiments are applicable to many other different kinds of payment card networks as well; the AMERICAN EXPRESS® network and the DISCOVER® network are non-limiting examples.

Figure 4:
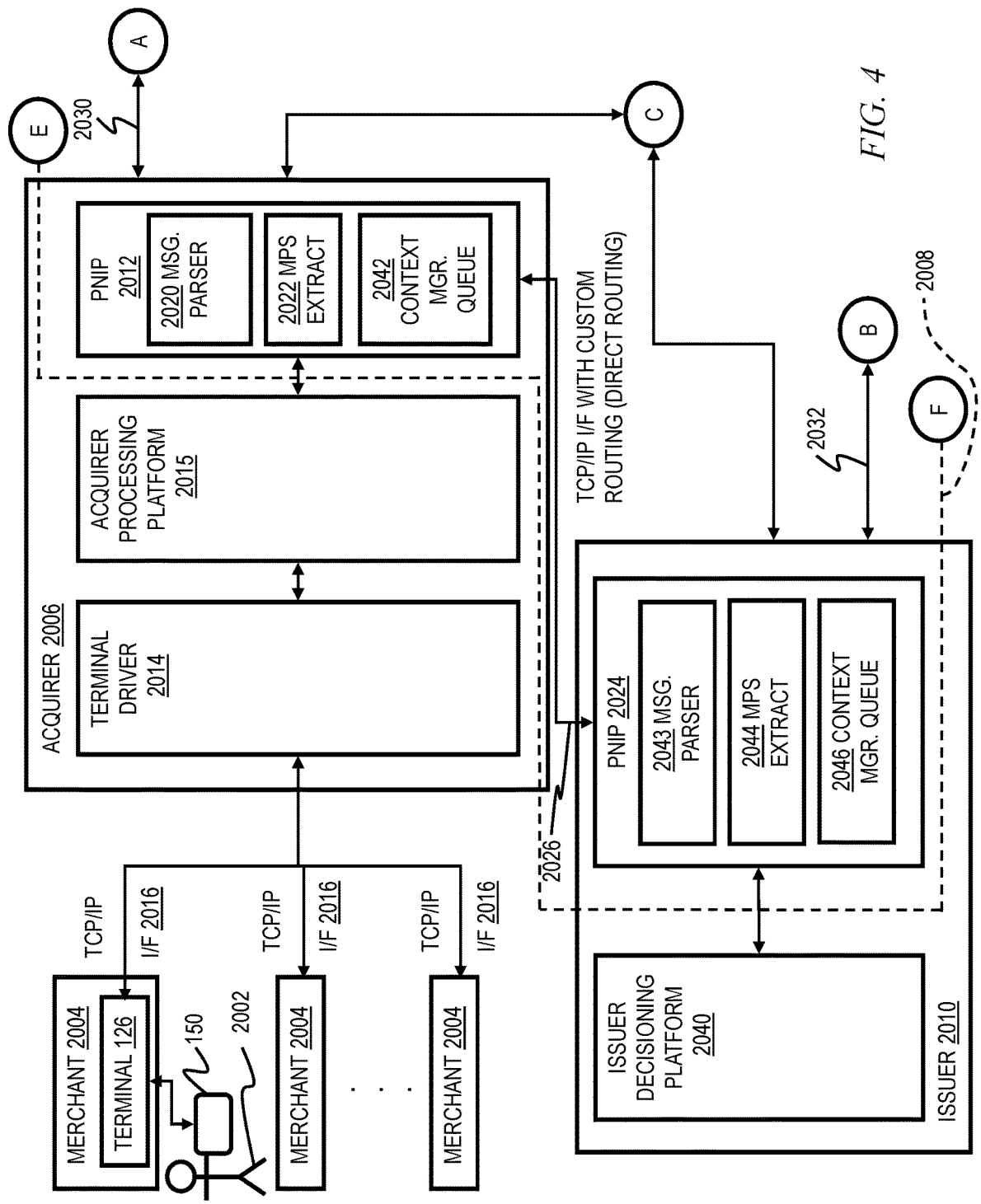
FIGS. 4 and 5 provide an exemplary detailed view of operation of a payment card network, in accordance with an aspect of the disclosure.
Figure 5:
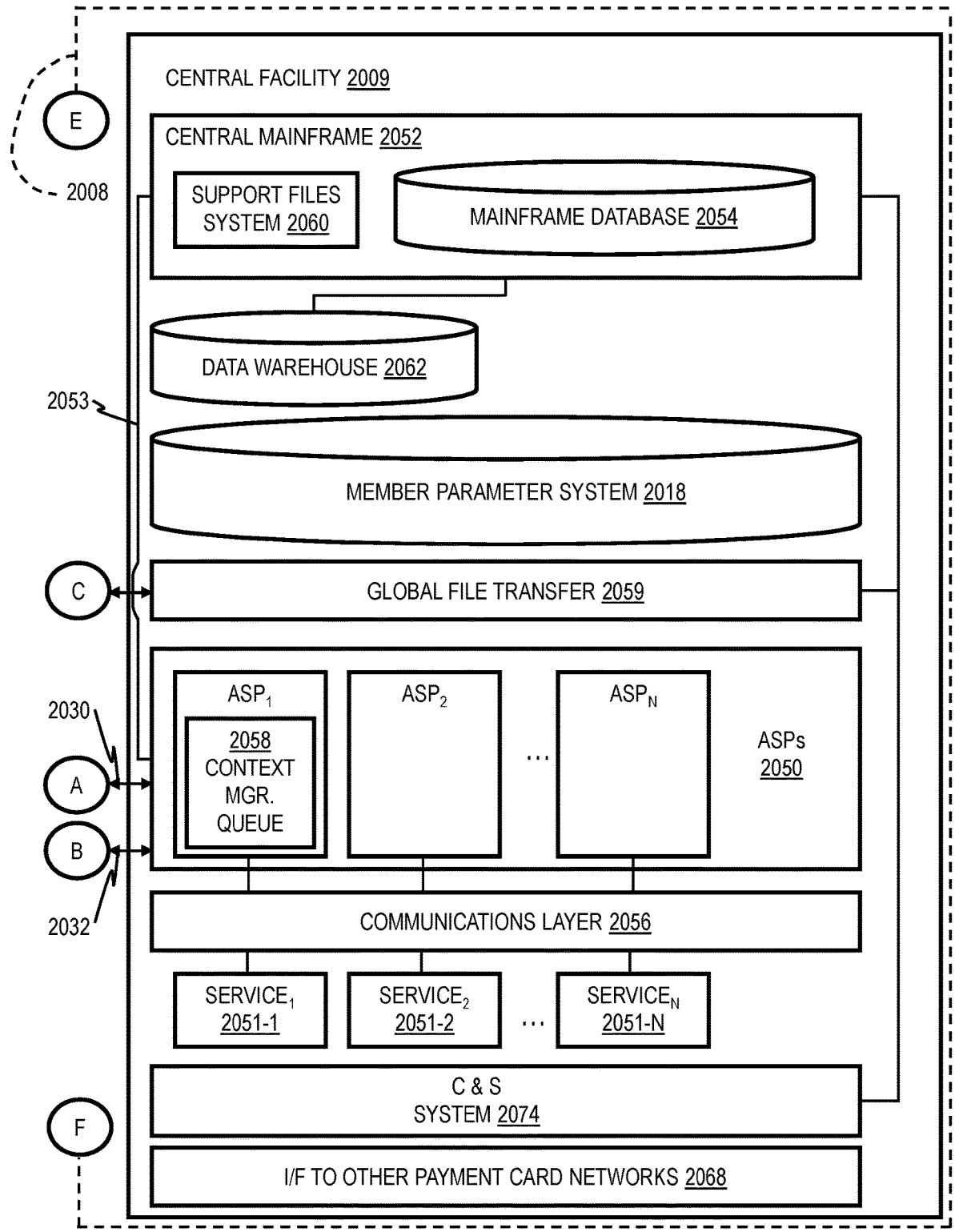

Still referring to FIG. 2, and with reference also now to FIGS. 4 and 5, by way of review and provision of additional detail, a consumer 2002 effectively presents his or her card 150 or other payment device (e.g., presents suitably configured "smart" phone or uses an e-wallet) to the terminal 126 of a merchant 2004. A mag stripe card 150 and combined terminal 126 are shown by way of example, but are intended to generally represent any kind of payment device and any kind of terminal. The effective presentation can happen directly (user enters a brick and mortar location of a merchant 2004) or virtually (user logs on to a web site of a merchant 2004 via a browser of a personal computer or the like, or calls on the telephone, and provides card information, or sends a "snail" mail with payment card account information to a merchant). The merchant terminal 126 captures the card account information (for example, by swiping or wireless communication if directly presented; by manual keying or reading data if remote) and forwards same to the acquirer 2006. Interaction between the merchant and cardholder is outside the purview of the payment card network per se. The payment card network becomes involved at the connection between the acquirer 2006 and network 2008; the dotted line between points E and F in FIGS. 4 and 5 encompasses the network 2008. Note generally that points A, B, C, E, and F in FIG. 4 connect to the corresponding points in FIG. 5; the entire network and associated environment are not amenable to illustration on a single sheet.

More specifically, the acquirer 2006, in the more specific example of FIGS. 4 and 5, has at its premises a payment network interface processor (PNIP 2012). The Mastercard Interface Processor or MIP is a non-limiting example of a PNIP. In a non-limiting example, the PNIP is implemented on a rack-mounted server. PNIPs are typically located at the edges of the payment card network. In at least some instances, the payment card network of FIG. 2 is a distributed network wherein each acquirer and issuer has at least one PNIP on their premises. Each acquirer 2006 will have a relationship with one or more merchants 2004 and will interface with the merchants' terminals 126 via terminal driver 2014 (an acquirer may also act as an acquirer for themselves as a merchant). Furthermore in this regard, the merchant locations will have terminals where the cards are swiped (or where contacted or contactless devices are presented). The acquirer will employ terminal driver 2014 to interface with those terminals. Terminal driver 2014 is a logical block representing software and/or hardware that allows the acquirer processing platform 2015 to communicate with the terminals of the merchants via TCP, dial up, or the like (TCP/IP interfaces 2016 are shown in the example in the figures). Each merchant will decide what acquirer to use to accept one or more brands of payment cards, and the acquirer will set the merchant up with the appropriate software and/or firmware for the merchant's point of sale devices.

The acquirer 2006 will present transactions from many different merchants 2004 to the payment card network operator 2008 via the PNIP interface 2012. The connection between the merchants 2004 and the acquirer 2006 is typically a TCP/IP interface 2016. The format that the transaction is in when the card is swiped at the merchant 2004 may differ from the format that the transaction is in when actually received by the payment card network operator. The acquirer may convert the transaction into the ISO 8583 format or into a format that is a specific implementation of the ISO 8583 format (e.g., the MASTERCARD CIS (customer interface specification) format). The authorization request message can be an ISO 8583 message type identifier (MTI) 0100 message, for example, sent over the communications interface 2016 between the merchant 2004 and the acquirer 2006.

Once the 0100 message is received at the PNIP 2012 of the acquirer 2006, a series of edits can be performed on the transaction with respect to format, content, and/or context. Furthermore, screening can be carried out to determine whether the message relates to something beyond an ordinary authorization request, referred to as an enhanced service. Enhanced services may be screened for on behalf of one or more issuers 2010 and/or the operator of network 2008 itself. A centralized member parameter system (MPS) 2018 can be provided to house parameters used to drive processing of credit authorization transactions. In one or more embodiments, extracts from the centralized member parameter system 2018 are distributed to all acquirer PNIPs 2012 and issuer PNIPs 2024 on the network 2008 on a daily basis to drive processing of credit card transactions.

It should be noted at this point that an "ICA" and a "BIN" are employed in BANKNET so that a member can perform card issuing and/or acquiring activities. An ICA or Interbank Card Association is a four to six digit identification assigned by Mastercard for use by a member to uniquely identify activity the member is responsible for. A BIN or Bank Identification Number is a unique series of numbers assigned by Mastercard to a principal member and used as the first six digits of a cardholder account number. Other payment card networks have similar types of numbers, as will be apparent to the skilled artisan.

Figure 7:
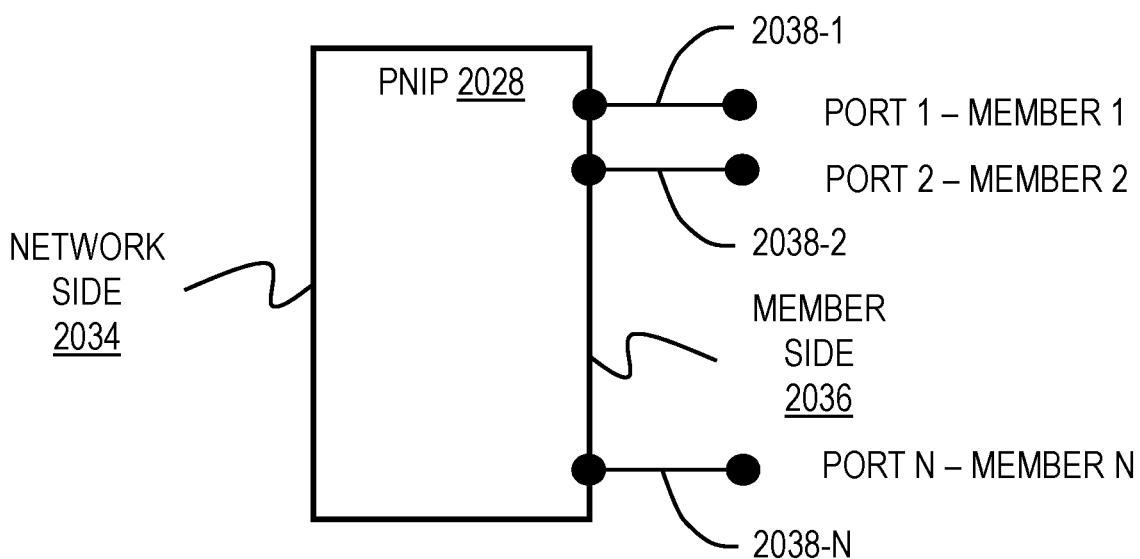
FIG. 7 shows a port arrangement on a payment network interface processor, such as may be used with the network of FIGS. 4 and 5.

In at least some embodiments, the same member parameter extract is sent to all PNIPs and transactions are routed using same. In at least some circumstances, account numbers or ranges of account numbers are used in deciding how to route. In some cases, transactions are routed to an issuer PNIP based on where the account range is "signed in." Issuers send an MTI 0800 sign in request message with either a group ID or account range. The Member ID is pulled from the PNIP port 2038 (discussed elsewhere herein) configuration and transactions from that account range are then routed to the port from which the sign-in request is received. A member ID can be present on ports on multiple PNIPs at an Issuer site—see discussion of FIG. 7 below.

In one or more embodiments, based on the account range, the parameters in MPS 2018 (or a local extract thereof) will determine how to process a given transaction; e.g., product code, country code, currency code, and the like, including what enhanced services (if any) the issuer has signed up for on a particular account range. That is to say, the messages are parsed and certain fields, including the account range, are examined; the account range is associated with a certain issuer and based on that, the message may be treated differently. Messages may be parsed, and converted into an internal data format so that access can be obtained to all the individual data elements. In one or more embodiments, the account number is used as a key to access the MPS 2018 (or a local extract thereof) and retrieve all the parameters that are appropriate for processing the given transaction. In a non-limiting example, a suitable message parser 2020 (and other programs on the PNIP 2012) can be written in an appropriate high-level language or the like.

In an exemplary embodiment, the central MPS 2018 creates extracts once a day that are distributed out to the endpoints on the network (e.g., PNIPs 2012), as seen at 2022. These extracts include the pertinent information needed for the PNIP to process the message and determine if it requires any special handling. In some instances, messages are next routed to a central site 2009 for performance of enhanced services. On the other hand, if no special services are required, the message may be routed directly to the issuer PNIP 2024 as seen at 2026.

Messages Routed Directly to the Issuer PNIP:

In this aspect, the transaction is routed directly to the issuer PNIP 2024 based on the MPS extract 2022, as seen at 2026. Every account range will have a unique destination endpoint identified in the parameters (account ranges may be grouped and all members of the account range group may have a common destination endpoint). The member interface refers to the connection between the acquirer processor 2006 and the Acquirer PNIP 2012. This term also applies to the interface between the Issuer PNIP 2024 and issuer processor 2010. The connections between and among acquirer PNIP 2012 and issuer PNIP 2024, acquirer PNIP 2012 and ASPs 2050 (discussed elsewhere herein), and ASPs 2050 and issuer PNIP 2024 are referred to as a network interface onto the payment card network itself. In one or more embodiments, this may be a TCP/IP connection (as seen at 2026) with customized routing capabilities including group addresses. Normally, TCP/IP addresses refer to a single endpoint. Group addresses may be directed to a group of addresses, and will target any of the computers (e.g., PNIPs) in the group using a variety of protocols. Some use a round robin approach; others may use a first in list approach where the message is always routed to one given computer first and then to a second computer only if the first is not available. Group addressing may be useful, for example, where an acquirer or issuer has multiple PNIPS at the same location for redundancy/fault tolerance. It is also possible to combine the approach and institute a round robin, wherein the addresses within the round robin are first in list group address, or conversely, it is possible to institute a first-in-list, wherein the addresses within the first-in-list are round robin group addresses. These capabilities are useful in case of outages, maintenance, and the like.

Figure 6:
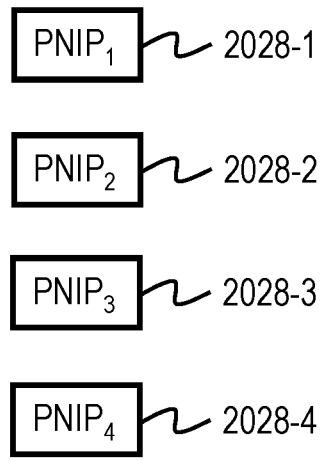
FIG. 6 shows a group of payment network interface processors, such as may be used with the network of FIGS. 4 and 5.
Figure 9:
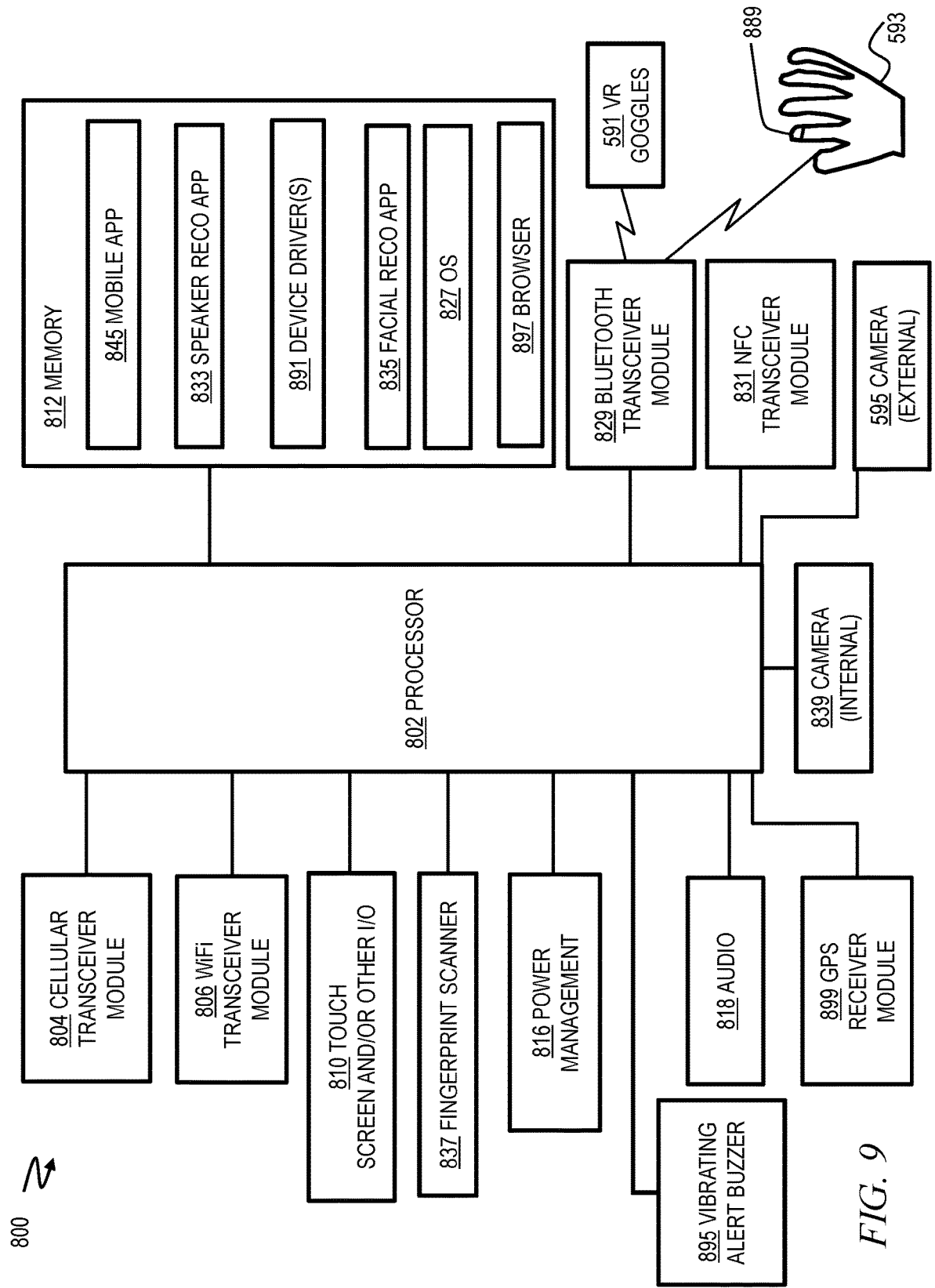
FIG. 9 is a block diagram of a "smart" phone or tablet computer useful in one or more embodiments of the invention.

FIG. 6 shows a non-limiting example with four PNIPs 2028-1 through 2028-4. In a round robin approach, a first message is routed first to PNIP 2028-1, a second message to PNIP 2028-2, a third message to PNIP 2028-3, a fourth message to PNIP 2028-4, a fifth message to PNIP 2028-1, and so on. In a first in list approach, all messages are routed to PNIP 2028-1; if it is not available for a given message, the message is routed to PNIP 2028-2; if PNIP 2028-2 is not available, the message is routed to PNIP 2028-3; if PNIP 2028-3 is not available, the message is routed to 2028-4. Each PNIP 2028-1 through 2028-4 in FIG. 6 could be a single machine or a group of machines addressed by first in list or round robin as discussed just above. In one or more embodiments, the physical network 2026 between PNIPs 2012, 2024 and the physical network 2030, 2032 between PNIPs 2012, 2024 and the central site 2009 is a private Multiprotocol Label Switching (MPLS) TCP/IP network and is not the Internet. Once the issuer's network group address has been determined by the PNIP 2012 (or ASP 2050), the message is routed to the issuer PNIP 2024. Once the 0100 auth message arrives at the issuer PNIP 2024, additional edits are performed to double check and make sure that the message has been routed to the correct location. Furthermore, the member ID is examined, because some issuers may share a single PNIP and it is necessary to determine which of the issuers (members) sharing that PNIP the transaction in question is to be routed to. Each of the issuers sharing the PNIP will have its own port on the member side of the PNIP; the transaction is routed to the appropriate port based on the member parameters. See FIG. 7 where a generalized PNIP 2028 has a network side 2034 and a member side 2036. Member side 2036 has N ports 2038-1 through 2038-N to members 1 to N. N is used herein as a generalized arbitrary integer and the value of N in FIG. 9 is not necessarily the same as that of N in connection with elements 2002 in FIG. 2, for example.

Figure 8:
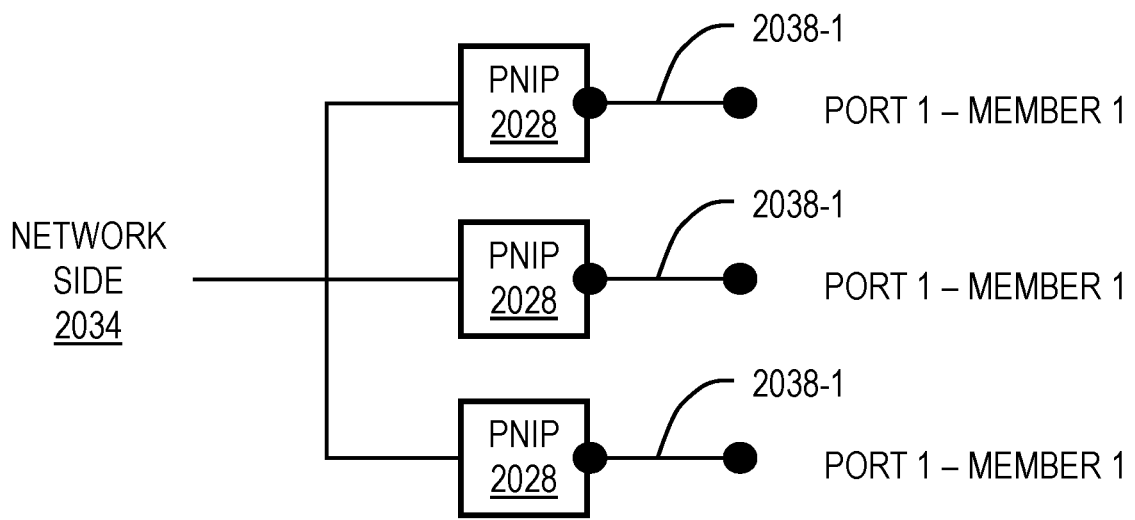
FIG. 8 shows a case wherein an issuer has multiple payment network interface processors.

As seen in FIG. 8, in some instances, an issuer has multiple PNIP devices 2028 at a single site, with a network-side connection 2034, and with multiple PNIPs 2028 all connected to the same host system (each has port 1 2038-1 associated with the same member (issuer)).

At this point, the 0100 message has been delivered to the issuer 2010. The issuer 2010 then carries out issuer processing and decisioning (e.g., with issuer processing platform 2040) based on transaction velocities, open to buy, fraud detection protocols, etc., and provides an appropriate authorization request response, ISO 8583 MTI 0110. There are a number of different possible response codes defined within ISO 8583 and its particular implementations. Each transaction is made up of multiple data elements; the response from the issuer is included in data element 39. Once the 0110 message is received on the issuer PNIP 2024 from platform 2040 it is parsed and edited for format, content, and context, including validation of DE39 to make sure that it is a valid value.

It is worth noting that in one or more instances, at every point where a transaction touches a computer of the payment card network, whether it be an acquirer PNIP 2012, issuer PNIP 2024, or a special services computer or computers 2050 at the central location 2009 (discussed below), transaction context is preserved. That is to say, before the message is sent on to the next node in the network, a copy is saved in a context manager queue 2042, 2046, 2058, so that when the transaction response MTI 0110 comes back through, the request MTI 0100 can be matched with the response, in order to know how to route the response back to the previous route point. One of the items saved in the context manager queue is the message originator's address, so that it can be used for route-back information. Once the issuer PNIP validation is complete, including format, content, and context edits, the transaction is extracted from the context manager queue 2046 and the route-back address is retrieved, and the 0110 message is then sent back where it came from; in this case, the acquirer PNIP 2012 (or ASP 2050). The acquirer PNIP 2012 then receives and parses the message and pulls its original request out of its context manager queue 2042. Note that multiple acquirers may share an acquirer PNIP and it is therefore necessary to know which port on the acquirer PNIP to route the response back to (see discussion of FIG. 7). Checking the message against the original request in the context manager queue allows the message to be routed back to the correct port.

Each PNIP 2012, 2024 typically has many different programs. These can include, for example, a parser/editor 2020, 2043; a parameter file manager; a transaction context manager; a member communications program; a network communications program; and the like. Please note that to reduce clutter, FIGS. 4 and 5 show "MPS extract" 2022, 2044; this will typically include the extract itself and the associated parameter file manager which manages obtaining the extracts from MPS 2018. Similarly, to reduce clutter, FIGS. 4 and 5 show "context manager queue" 2042, 2046; this will typically include the queue itself and the associated manager which manages the contents of the queue. In one or more embodiments, there is also a communication program used to communicate between the other programs (inter-process communications) on the PNIP; this is omitted from FIGS. 4 and 5 to avoid clutter.

Messages in Case of Enhanced Services:

In one or more instances, a special architecture is used to facilitate delivery of enhanced services (the ASP 2050 in FIGS. 4 and 5 is a non-limiting example). Examples of enhanced services include the Mastercard "inControl" product providing spending controls and/or virtual card numbers. Other examples are loyalty rewards, recurring payment cancellations, and the like. One or more instances do not deploy this complex logic out to the network edge. Furthermore in this regard, the issuer and acquirer PNIPs 2012, 2024 are referred to as being on the edge because they reside on the customer's premises 2006, 2010. There may be over 2000 PNIPs on a typical network. The special architecture used in one or more instances is a central site type architecture associated with location 2009. At the central site 2009, certain computers are referred to as authorization services processors or ASPs 2050.

On the acquirer PNIP 2012, when checking the member parameter file for an account range, determine whether the transaction requires enhanced services. If yes, the transaction is routed to the central site ASPs 2050, which have interfaces to all of the service provider systems—the ASPs do not necessarily provide the services themselves (although they can in some embodiments), but may mediate between the network (e.g., BANKNET) and the actual service providers 2051-1 through 2051-N. An ASP will typically have connections 2053 to a mainframe 2052 via DB2 connect or other suitable connection. If a transaction is to be enriched with additional data, a database call will be made to the mainframe 2052 to retrieve the information from mainframe database 2054 so that it can be inserted into the transaction before the transaction is forwarded to the issuers. Interfaces can also be provided to a risk management system, a decisioning management system, IN CONTROL, rewards, and the like. Service providers 2051-1 through 2051-N generally represent any enhanced services, non-limiting examples of which have been given herein.

A communications layer 2056 is used to communicate with the service providers in one or more embodiments, a non-limiting example of a suitable implementation is the IBM MQ series. The 0100 message may be sent to the service providers, optionally encapsulated inside a special "enhanced services" (ES) header that wraps the message with any additional information required to fulfill the service. The service provider sends a response. The ASP takes the response and enriches the 0100 transaction with the service response, and then sends the entire package on to the issuer PNIP 2024. Some enhanced services are processed on the request messages (0100) and others are processed on the response messages (0110). Once the response message is processed on the ASP, the original message will be pulled from the context manager queue 2058 on the ASP to determine the appropriate acquirer PNIP 2012 to route the message back to. From there, the acquirer PNIP will behave just as in the "Messages routed directly to the issuer PNIP" case discussed above. Some embodiments of the special architecture use an Enterprise Service Bus to mediate and facilitate some of the services 2051. For example, the In CONTROL service can be accessed via an instance of an Enterprise Service Bus.

Entry of Data into the Data Warehouse:

In one or more instances, every transaction that flows through the issuer PNIP 2012, acquirer PNIP 2024, and/or ASPs 2050 is logged at every point by writing log records. Multiple times a day (e.g., six), a global file transfer system 2059 pulls the logs off each node and collects them into a support files system 2060 on the mainframe 2052. The log files are parsed and collected into a general daily file. The general daily file is scrubbed and modified to create a consolidated file on the mainframe which is then pulled into the data warehouse 2062, where additional data manipulation and scrubbing are performed before the transactions are stored. The data warehouse 2062 is located at an intermediate node (location 2009) connected to the PNIPs of the acquirers and issuers 2012, 2024. By way of clarification, in one or more embodiments, the node 2009 is directly connected to the PNIPs 2012, 2024 but the data warehouse is not directly connected to the 2012 and 2024 devices; rather, data flows through GFT and SF systems 2059, 2060 and ends up in the data warehouse. Data warehouse 2062 should be distinguished from a data warehouse 154 that might be maintained by an issuer.

Clearing and Settlement:

One or more instances employ a clearing and settlement system 2074. In clearing, via global file transfer 2059, acquirers submit clearing files in an appropriate message format (in a non-limiting example, Integrated Product Messages (IPM) format). The files contain, from the acquirers' perspective, what they believe they should be paid for. In one or more instances, the authorization does not actually move any money; the authorization only validates that the cardholder is a valid cardholder recognized by the bank, which will honor payment to the merchant for the goods or services. For example, in a typical restaurant visit, the card is swiped for the receipt amount but then a tip is added. The clearing message will have the actual food amount plus the tip. In one or more instances, the clearing does not actually move the money; it merely resolves the actual amounts. The settlement system actually initiates movement of the money. Furthermore in this regard, the settlement system actually tells the banks how much money to move but does not actually move the money. Within clearing, processes include dispute resolution, chargeback, and the like. During clearing, files are sent from the acquirers to the payment card network; the payment card network, using clearing and settlement system 2074, then takes the files and splits them and sorts them by issuer. Response files are then received from each issuer, and these response files are again split and re-sorted back to the correct acquirers. Eventually, data flows into the settlement system and money is moved. Thus, at a high level, the auth request and auth request response are in real time, and the clearing and settlement are in a batch mode.

By way of review and provision of additional detail, in at least some instances, in a batch mode, clearing is initiated via an ISO 8583 MTI 1240 message having a DE24 function code value of 200 for a first presentment. Once this message is obtained from the acquirer, the payment card network, using clearing and settlement system 2074, will undertake syntax edits, format edits, content edits, and context edits (typically applied to every transaction). If those edits are passed, the interchange and fees associated with the transaction will be calculated. Based on the calculations, the message may also be enriched with additional information before being passed on to the issuer. The settlement amount is then determined. Within the clearing cycle, the amounts of money due to each given member (e.g., issuer or acquirer) are accumulated, and these are summed up into a settlement file which is forwarded in due course.

Cryptographic Aspects:

Consider the concepts of data at rest and data in motion. An example of data at rest is the log files that actually reside on the PNIPS themselves—configuration information containing card numbers or personally identifiable information (PII). In one or more embodiments, all sensitive data at rest is encrypted before being written to disk. Data in motion refers to data actually moving over a transmission medium (e.g., wires, coaxial cable, fiber optic cable, RF link). All PCI-sensitive data (PCI Security Standards Council, LLC, Wakefield, Mass. US) is encrypted, whether written to disk or being sent over a network. In at least some instances, internal links within the premises of the acquirers and issuers are not encrypted since it is assumed that the customer premises are a physically secure facility relying on physical security of the hardware. On the other hand, in at least some instances, external links (e.g., links 2026, 2030 and 2032) are all encrypted for both authorization traffic and bulk file transfers.

One or more embodiments will have interface(s) 2068 to other brands of payment card processing network. For example, a MASTERCARD branded payment card processing network may have interfaces to networks such as AMERICAN EXPRESS, VISA, JCB, DISCOVER, and the like. Suitable translation layers can be provided to intermediate between MASTERCARD (or other) format and formats used by other networks, as appropriate. In one or more embodiments, interfaces 2068 to other payment networks are provided via a machine, located at 2009, but generally analogous to an Issuer PNIP 2024 with added mediation layers loaded as required by other payment network formats. Some merchants may only have a single interface to, e.g., the MASTERCARD network—all transactions from that merchant may be routed to MASTERCARD, regardless of what card was used—MASTERCARD will process those transactions and route them out to the appropriate networks.

While payment card networks have generally been used as described with regard to FIGS. 1 and 2, recently, Mastercard MONEYSEND (mark of Mastercard International Incorporated, Purchase, N.Y., US) money transfer services have provided a new dimension. A funding transaction moves money from the sender (customer) to the Originating Institution (the financial institution providing the money transfer service); that transaction can be initiated through a MONEYSEND application program interface (API). The sender can fund the transaction using a Mastercard card account or other branded card account that the Originating Institution accepts; from a bank account; or with cash. A Payment Transaction transfers funds from the Originating Institution, via the Mastercard Network (e.g., BANKNET), to the payment card account identified by the recipient at the Receiving Institution. Funds can be transferred to a Mastercard® card, Debit Mastercard® card, and the like (marks of Mastercard International Incorporated, Purchase, N.Y., US). Such transactions are a non-limiting example of what can be more generally referred to as special payment transactions.

Electronic Bill Presentment and/or Payment Systems

Electronic bill presentment and payment systems are conceptually different than payment card networks, and will often use electronic funds transfer from a demand deposit account. In some instances, a single entity, such as Mastercard International Incorporated (a non-limiting example) will operate both a payment card network and an electronic bill presentment and payment system.

With regard to electronic bill presentment and payment systems, inventive techniques can be employed in a number of different environments. In one or more embodiments, inventive techniques can be employed in connection with the MASTERCARD RPPS® electronic payment system of MasterCard International Incorporated of Purchase, N.Y., USA. This example is non-limiting; for example, other types of electronic bill presentment and/or payment systems could be employed in other instances. Non-limiting examples are is described in:

US Patent Publication 2011-0251952 A1 of Mary L. Kelly et al.
US Patent Publication 2012-0197788 A1 of Hemal Sanghvi et al.
US Patent Publication 2013-0290177 A1 of Amy Christine Milam and Stephen Joseph Klaus.
US Patent Publication 2013-0311362 A1 of Amy C. Milam et al.

The above-listed Kelly et al., Sanghvi et al., Milam/Klaus, and Milam et al. publications are hereby expressly incorporated by reference herein in their entireties for all purposes.

For the avoidance of doubt, references to Mastercard, unless expressly stated to be limited to Mastercard, are intended to be exemplary of an operator of an electronic BPPS and/or an operator of a payment card network, as will be appreciated from the context, whether or not qualified by words such as "or other operator."

Furthermore, another non-limiting example of an electronic BPPS with which one or more embodiments of the invention can be employed is the CHECKFREE® platform available from Fiserv, Inc. of Brookfield, Wis., USA.

Figure 3:
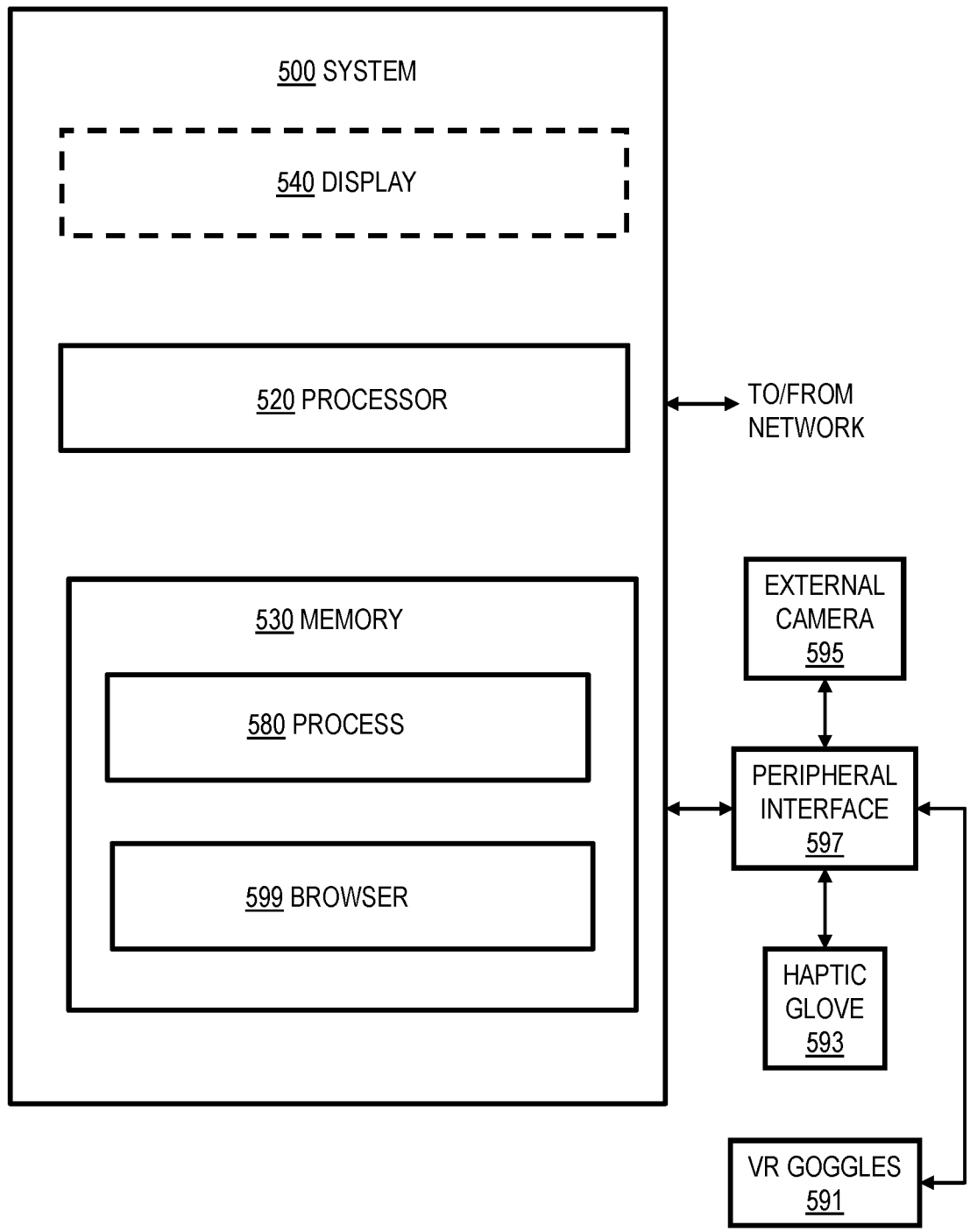
FIG. 3 is a block diagram of an exemplary computer system useful in one or more embodiments of the invention.
Figure 13:
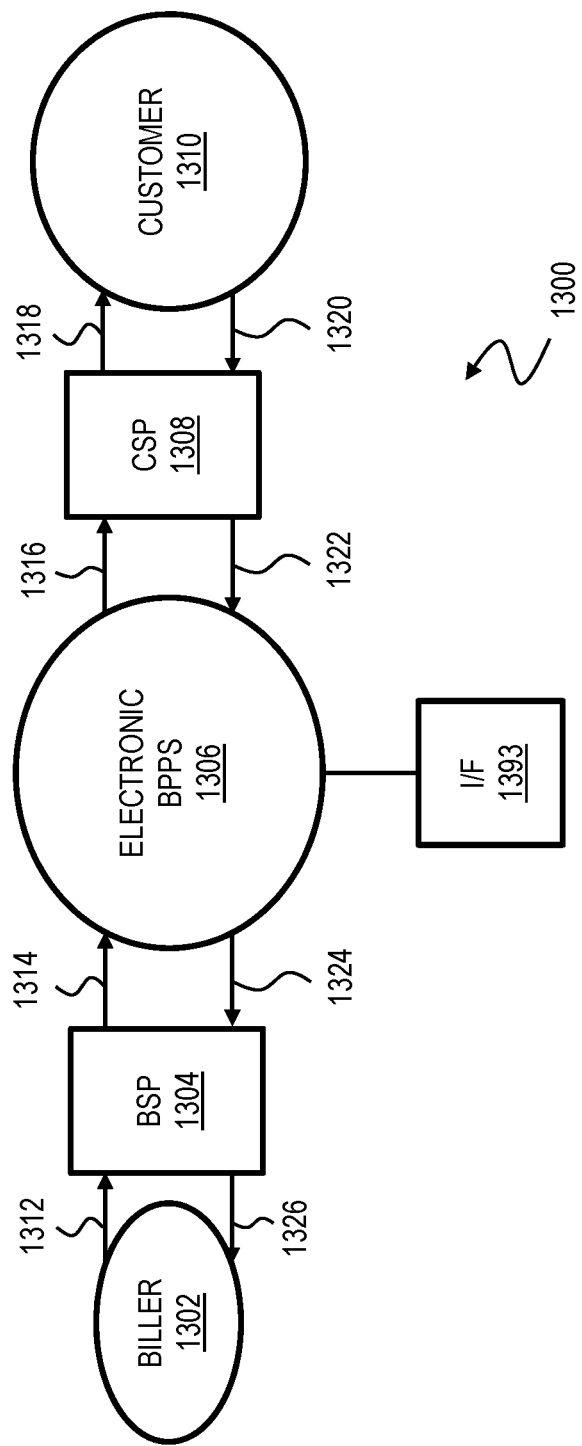
FIG. 13 shows exemplary operation of a bill presentment and payment system (BPPS), in accordance with an aspect of the invention.

FIG. 13 shows operation of an electronic BPPS, such as the MASTERCARD RPPS® electronic bill presentment and payment system, which is but one non-limiting example of such a system, modified in accordance with aspects of the invention. Given the teachings herein, the skilled artisan will be able to implement one or more embodiments of the invention using a variety of techniques; by way of example and not limitation, the modification or supplementing of an existing MASTERCARD RPPS® system or other electronic BPPS as shown in FIG. 13. As shown in FIG. 3, in an approach 1300, during a presentment phase, a biller 1302 electronically sends billing information 1312 to its biller service provider (BSP) 1304; that is, an institution that acts as an intermediary between the biller and the consumer for the exchange of electronic bill payment information. BSP 1304 in turn sends the information to the electronic BPPS 1306, as seen at 1314. As seen at 1316, the system 1306 in turn delivers the billing information to the customer service provider (CSP) 1308, that is, an agent of the customer that provides an interface directly to customers, businesses, or others for bill payment and presentment. The CSP enrolls customers, enables payment and presentment, and provides customer care. CSP 1308 presents the bill to the consumer (customer) 1310 at 1318.

In a payment phase, consumer 1310 sends bill payment instructions to CSP 1308, as seen at 1320. CSP 1308 in turn sends the bill payment information to the system 1306, as at 1322. The system sends funds and data electronically to BSP 1304, as at 1324. The BSP 1304 posts payment information to the biller 1302, as at 1326.

Note that in some instances, billers 1302 can connect directly to BPPS 1306 without the use of BSP 1304. In such cases, billers 1302 exchange presentment and payment data directly with BPPS 1306.

Again, note that "BPPS" is used herein as shorthand for an electronic "bill presentment and payment system"; the RPPS system is a non-limiting example of such a system. Furthermore, some embodiments utilize only bill presentment functionality and do not require bill payment functionality.

A suitable interface 1393 is provided in one or more embodiments to initiate bill payments responsive to "haptic handshakes" or the like, as described elsewhere herein. For examples, business rules are coded and triggered based on handshake completion (or alternatively, in a two-trigger approach, based on handshake initiation and subsequent handshake completion); responsive to the trigger, a message is initiated (e.g. from server 1201 via server 1203) to a back end system of the BPPS 1306 (e.g., via log entry, e-mail, SMS, or the like).

Figure 14:
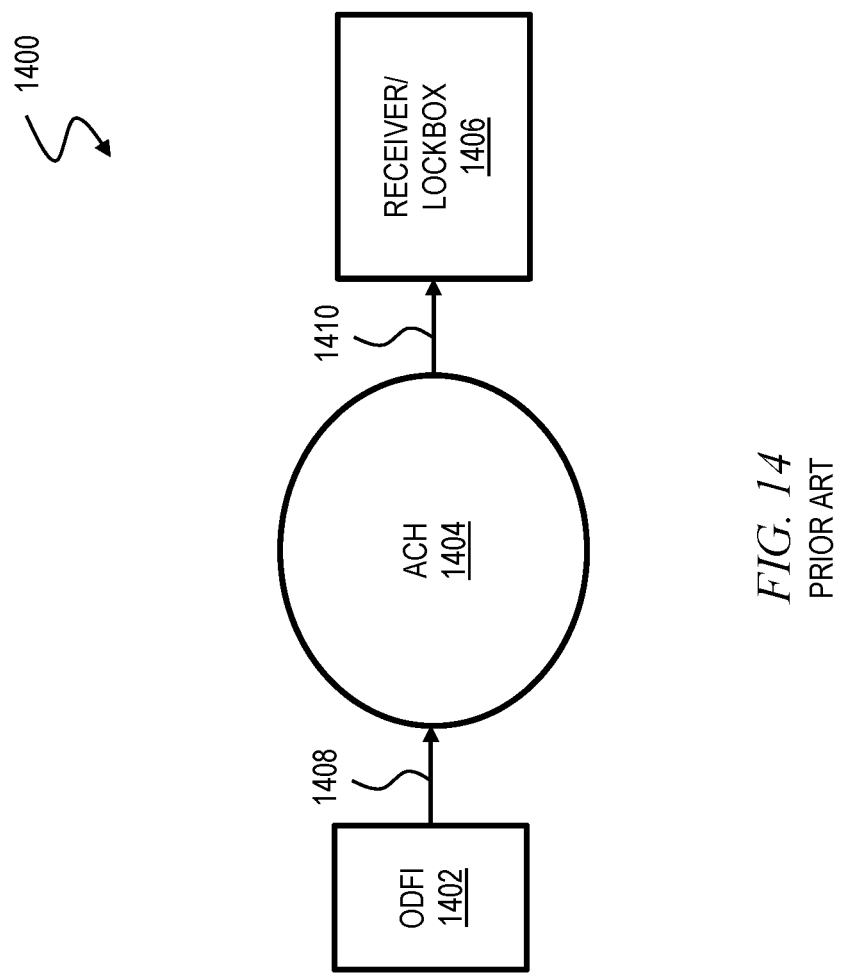
FIG. 14 shows exemplary operation of current automated clearinghouse payments.

FIG. 14 shows a current process 1400 for making electronic funds transfers (EFT) for bill payment or the like. An originating depository financial institution (ODFI) 1402, also known as an originator, sends instructions (e.g., payment data and remittance data) using a network such as the automated clearing house (ACH) 1404, Swift, EPN, CHIPS, Fedwire, and the like, as seen at 1408. As shown at 1410, the ACH or similar network 1404 relays the instructions to the receiving depository financial institution (RDFI) (e.g., receiver or a lockbox), designated 1406. In some embodiments, an ACH file format can be used; non-limiting examples of ACH file formats include the NACHA ACH CIE, NACHA ACH PPD, or NACHA ACH CCD (e.g. for corporate-to-corporate cases) file formats. Other formats can also be used; for example, extensible markup language (XML). It should be noted that a variety of networks can be used, both public (for example, ACH) and proprietary (for example, the aforementioned MASTERCARD RPPS system).

As used herein, an "electronic bill presentment system using customer service providers" refers to a system wherein electronic bills are distributed from billers, through an aggregator switch, out to financial institutions or other customer service providers such that those financial institutions or other customer service providers can display the electronic bills, through the financial institutions' or other customer service providers' own on-line banking interface, to bill-paying customers of the financial institutions or other customer service providers. FIG. 5 of the above-referenced US Patent Publication 2011-0251952 A1 of Mary L. Kelly et al. shows an exemplary block diagram of an electronic bill presentment system, including a bill payment platform and a bill presentment platform; the bill payment platform may utilize techniques disclosed in the above-referenced US Patent Publication 2012-0197788 A1 of Hemal Sanghvi et al.

Some electronic bill payment systems use the NACHA ACH Standard Entry Class (SEC) formats, such as CIE (Customer Initiated Entries), CTX (Corporate trade exchange); CCD (Cash Concentration or Disbursement); or PPD (Prearranged payment and deposits). Some electronic bill payment systems use a modified form of the NACHA CIE (MOD-CIE) wherein a payment system operator requires specific values for certain fields. Some electronic bill payment systems (e.g., MASTERCARD RPPS) provide translation capability and can receive input in many different formats, translate it for internal use, and translate it again for output in many different formats, which may be the same as or different from the input formats. Some electronic bill payment systems provide customer service providers with the capability to specify when the electronic bill payment system will look to them for payment instructions. Some electronic bill payment systems provide biller service providers with the capability to specify when the electronic bill payment system will initiate payments. FIG. 5 of the above-referenced US Patent Publication 2012-0197788 A1 of Hemal Sanghvi et al. shows exemplary system interfaces of an electronic bill payment system.

As noted above, electronic bill presentment and payment systems are conceptually different than payment card networks, and will often use electronic funds transfer from a demand deposit account. Nevertheless, some electronic bill presentment and/or payment systems receive and send data over a network such as is shown in FIG. 2, using capability such as MasterCard Global File Transfer (GFT). Furthermore, US Patent Publication 2010-0100480 of Theresa Altman et al., hereby expressly incorporated by reference herein in its entirety for all purposes, describes a system wherein payment of a bill using a payment card account is facilitated by formatting and dispatching a message from a bill payment provider to an electronic bill payment system. The message is flagged with a flag indicating that the message comprises a non-financial, card payment, message. The message includes an identification of the biller, a card number of the payment card account, and an expiration date of the payment card account. The message is an electronic funds transfer message augmented with the flag, the card number, and the expiration date.

Some electronic bill payment systems use technology such as described in the above-referenced US Patent Publication 2013-0290177 A1 of Milam and Klaus to reduce the number of non-electronic payments. Some electronic bill payment systems use technology such as described in the above-referenced US Patent Publication 2013-0311362 A1 of Amy C. Milam et al. to facilitate approximately matching entered payee information to stored biller information.

Exemplary Mobile Device

FIG. 9 is a block diagram of an exemplary tablet computing device, netbook, "Ultrabook" or other subnotebook, laptop, mobile electronic device, or smart phone 800 or the like. Unit 800 includes a suitable processor; e.g., a microprocessor 802. A cellular transceiver module 804 coupled to processor 802 includes an antenna and appropriate circuitry to send and receive cellular telephone signals, e.g., 3G or 4G. In some cases, a Wi-Fi transceiver module 806 coupled to processor 802 includes an antenna and appropriate circuitry to allow unit 800 to connect to the Internet via a wireless network access point or hotspot. The skilled artisan will appreciate that "Wi-Fi" is a trademark of the Wi-Fi Alliance and the brand name for products using the IEEE 802.11 family of standards. In some cases, a Bluetooth transceiver module 829 coupled to processor 802 includes an antenna and appropriate circuitry to allow unit 800 to connect to other devices via the Bluetooth wireless technology standard. In some cases, an NFC transceiver module 831 coupled to processor 802 includes an antenna and appropriate circuitry to allow unit 800 to establish radio communication via near-field communications.

Operating system (OS) 827 orchestrates the operation of unit 800. Apple's iOS and Google's Android are non-limiting examples of suitable operating systems.

Touch screen 810 coupled to processor 802 is also generally indicative of a variety of input/output (I/O) devices such as a keypad, another type of display, a mouse or other pointing device, and so on, all of which may or may not be present in one or more embodiments. Audio module 818 coupled to processor 802 includes, for example, an audio coder/decoder (codec), speaker, headphone jack, microphone, and so on. In some instances, a vibrating buzzer 895 is provided (e.g., a small electric motor connected to an off-center weight)—the vibrating buzzer 895 and audio module 818 can be thought of as part of a generalized notification system (not separately labeled) which can communicate with a user of the phone 800 via haptic techniques or otherwise. Power management system 816 can include a battery charger, an interface to a battery, and so on. Memory 812 is coupled to processor 802. Memory 812 can include, for example, volatile memory such as RAM, and non-volatile memory such as ROM, flash, or any tangible computer-readable recordable storage medium which stores information in a non-transitory manner. Processor 802 will typically also have on-chip memory.

In some cases, fingerprint scanner 837 is coupled to processor 802 for biometric authentication purposes. An appropriate corresponding software application (not separately depicted) may reside in memory 812 in some instances. An internal digital camera 839 is coupled to processor 802. Camera 839 (and/or external camera 595) can optionally be used in conjunction with a facial recognition application 835 in memory 812 for biometric verification. A microphone in audio module 818 can optionally be used in conjunction with a speaker recognition application 833 in memory 812 for biometric verification; a suitable acoustic front end can be provided.

A GPS receiver module 899 coupled to processor 802 includes an antenna and appropriate circuitry to allow device 800 to calculate its position by precisely timing the signals sent by GPS satellites high above the Earth. Corresponding software resides in memory 812.

Memory 812 can also include, for example, a stored PIN for comparison with a PIN entered via touch screen 810; extracted facial features from the legitimate owner of the phone for comparison with facial features extracted from a picture taken by camera 839; extracted fingerprint features from the legitimate owner of the phone for comparison with fingerprint features obtained from a scan carried out by scanner 837; and/or extracted voice features from the legitimate owner of the phone for comparison with voice features extracted from a voice sample obtained from a microphone in audio module 818. Note that elements in FIG. 9 are shown connected directly to processor 802; however, one or more bus structures can be employed in one or more embodiments. Furthermore, elements shown as implemented in software may be implemented at least in part in hardware for speed, if desired.

Browser program 897 in memory 812 deciphers hypertext markup language (html) served out by a server such as system 500 (discussed below) for display on screen 810 or the like.

In some embodiments, a haptic glove 593 or the like is coupled to phone 800 via Bluetooth interface 829 or another wireless interface (some devices can be hard wired to the haptic glove instead). A device driver 891 for glove 593 is in memory 812. Bluetooth or other wireless or wired interfacing is provided as appropriate to allow haptic glove 593 to communicate with the display of 810 of the tablet, phone, laptop, or desktop. In some instances, the haptic glove is used in conjunction with a touch screen and has a cut-out finger and/or fingertip with special conductive material, as at 889. The pointing device could thus be the haptic glove itself, a mouse, a trackball, a touch screen, or the like.

Virtual reality goggles 591 can be connected to the processor 802 via Bluetooth or some other wired or wireless interface. An external camera 595 can be connected to the processor 802 via a wired (e.g. USB) or wireless interface. Device drivers 891 can also include drivers for the external camera, goggles, etc.

Optional application (mobile app) 845 in memory 812 can be used for a variety of purposes, such as receiving notification that the handshake or other gesture sequence has been initiated and/or completed, and/or that one or more actions based on the initiation and/or completion of the gesture sequence have themselves been initiated and/or completed (e.g., payment made, access granted to software, and the like as described elsewhere herein). A variety of virtual reality/ augmented reality devices can be used, ranging from traditional headsets and/or goggles; to devices that work in conjunction with a "smart" phone such as the Samsung Gear VR (available from Samsung Electronics Co., Ltd., Suwon, South Korea); devices such as the Oculus VR (available from Oculus VR, Irvine, Calif., USA) with a built-in display system; and the like.

Every instance need not necessarily have every feature depicted in FIG. 9.

Virtual Reality Handshake and Related Aspects

One or more embodiments enable a capability in virtual reality where two parties meet in virtual space, "shake hands," and exchange money. The handshake may be "felt" using haptic feedback capabilities; authentication is completed by the parties prior to the handshake; the handshake effectively creates a transaction contract; and money is transferred from one account to another account. In virtual reality, payment authentication at the moment of purchase is not yet easily achieved. Consumer entry of PINs, passcodes, and other known secrets is difficult due to hardware limitations. Biometrics have yet to emerge in VR and may be costly to implement and therefore not universally available. In the physical world, a handshake is a universal acknowledgement of agreement. One or more embodiments advantageously bring the handshake into the virtual world.

In one or more exemplary embodiments, there are six components, it being understood that other embodiments could have more or fewer components:

1) Pre-authentication: a party will authenticate itself (e.g., biometrically, via a password, or the like) before entering VR space.
2) Identification of pre-authenticated parties: while "travelling" in VR space, parties are able to identify parties with whom a transaction may be completed (similar to the way an acceptance mark is used to identify where a payment scheme is accepted).
3) Offer to transact: visual cues are provided to indicate that the parties are ready to engage in a transaction.
4) Recognition of a handshake: visual and physical cues are provided to indicate that two parties are engaging in a handshake transaction (e.g. hands turn green, haptic feedback, etc.).
5) Process to establish a payment contract: records the important details of the transaction (order, amount, time, etc.) and the authentication status.
6) Processing of the transaction.

Furthermore regarding pre-authentication, in one or more embodiments, any suitable authentication technique can be employed. The goal is to provide a secure authenticated session between (1) the human using the VR environment and (2) the instance of the VR environment that human is interacting with. If two people desire to transact in the VR space, both should be assured that the purported person (avatar) they are dealing with is in fact a real person who has been authenticated to a real bank account that he or she is authorized to access and use. Thus, in one or more embodiments, a party entering the VR space needs to verify that he or she is in fact who he or she purports to be; for example, in coordination with his or her bank. Thus, in a non-limiting example, the individual seeking to enter the VR environment authenticates himself or herself to his or her bank and to the VR goggles he or she is using. Involving the bank in the transaction advantageously assures that the consumer has, in effect, an "open to buy" amount. Some embodiments provide an API (application programming interface) to permit communication between the bank and the VR environment.

Thus, one or more embodiments provide a "handshake" or the like to establish a payment contract between two parties in virtual reality. Embodiments are not limited to haptic techniques; however, haptic techniques can be employed in one or more embodiments. Suppose two individuals desire to undertake an action in a VR environment. Currently, on a desktop computer, a confirmation button or the like is provided. In a VR environment, a "confirm" button may not be present and the user may have more freedom of movement with his or her hands, as compared to a traditional desktop environment. One or more embodiments employ gesture recognition and/or a peripheral (e.g., haptic) glove that tracks the user's hand movements/hand location(s), to allow two people (who may be thousands of miles apart) to have their avatars in a virtual world reach out and appear to execute a handshake (or other appropriate gesture). This provides a more natural way to confirm an event, transaction, or the like: a calendar date for a scheduled meeting, a transfer of funds or other payment, etc.

Thus, one or more embodiments provide a "more human" way of indicating and/or confirming a transaction than using a confirm button. One or more embodiments can expand on agreed ways of doing this—in addition to a handshake, a bow, salute, wave, any other mutually agreed-upon action and/or gesture in a virtual environment, which will have an agreed-upon effect, can be employed. For example, in one or more embodiments, two people agree to do the same action at the same time; e.g., two keys are turned simultaneously. In another aspect, each person need not do the same thing. For example, one person could wave up and down, while the other could circle his or her hand over his or her head.

One or more embodiments can be, but need not be, used in connection with a transaction.

Some embodiments employ, within a VR environment, a secret agreed to by two people outside the virtual world. In some embodiments, the two people choose one or more pre-agreed actions that are not apparent to others watching the virtual world. For example, one person could raise his or her right hand, while the other puts his or her left hand out straight. In other instances, a trusted party publicly defines actions that define a transaction or the like so that all participants are aware.

Where a haptic peripheral is available, a "squeeze" from a haptic glove, simulating a handshake, lets the person know that agreement has been reached. The indication of agreement can, but need not, be a handshake. Again, any pre-agreed action and/or gesture between the two parties can be employed (pre-agreed in the sense of being defined by a trusted party (which may be a party other than the participants) or in some instances by the parties themselves).

While one or more embodiments are applicable in many different scenarios, one particular application involves payment and/or security functionality within the context of a payment card network. Furthermore in this regard, one or more embodiments involve the invocation of a higher trusted authority. Each consumer, prior to entering the VR environment (or at least prior to transacting), authenticates himself or herself to a higher trusted authority (e.g., each consumer's bank) so that each party can feel comfortable with the transaction.

Figure 10:
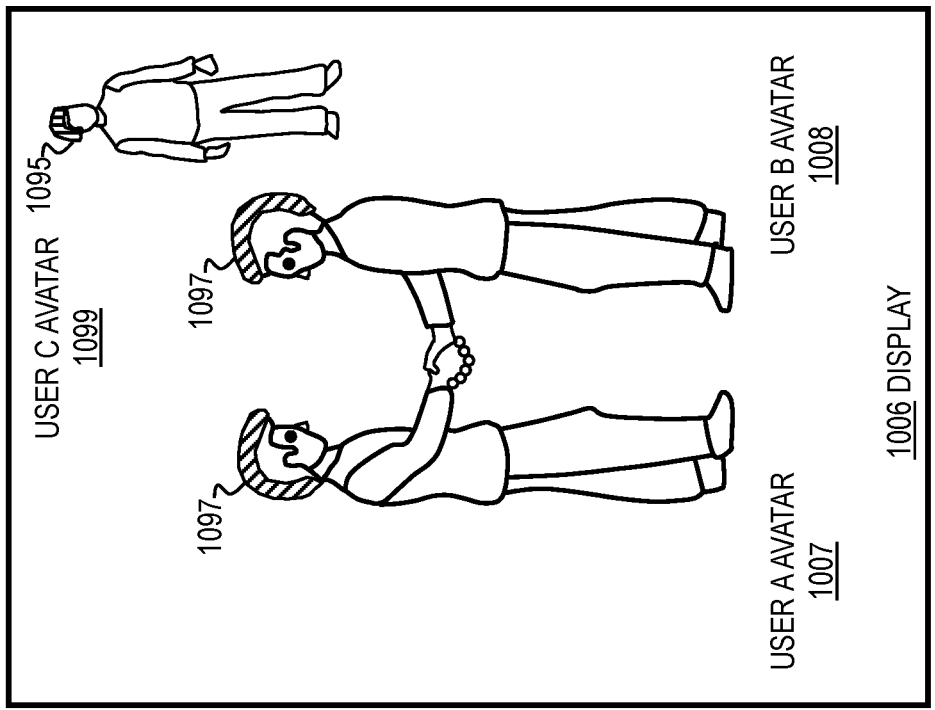
FIG. 10 is a combined block diagram and data flow diagram depicting a first embodiment of a system and method, according to an aspect of the invention.
Figure 10:
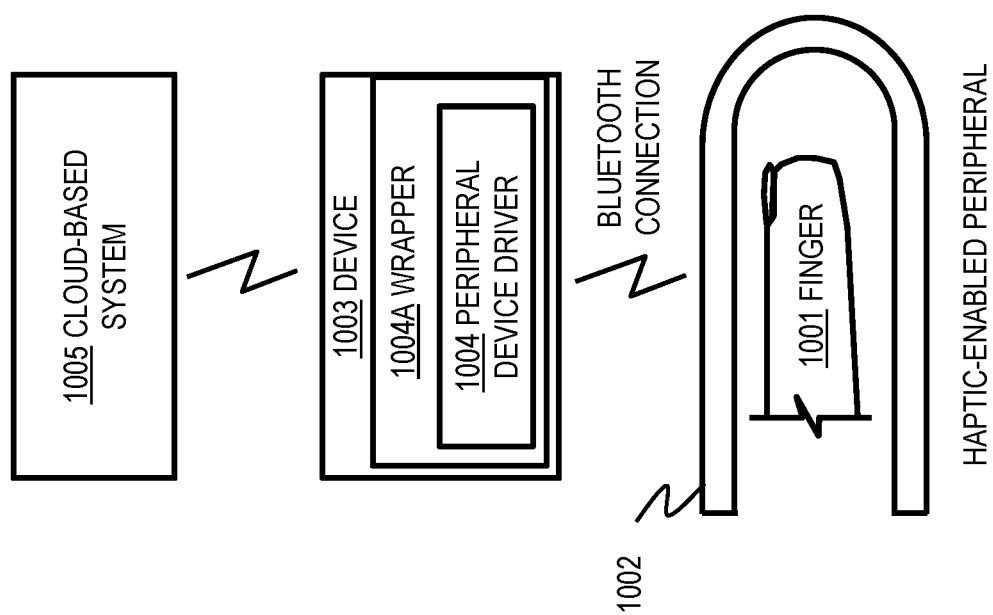

Refer now to FIG. 10, which depicts a first exemplary detailed embodiment of using a handshake to establish a payment contract between two parties in virtual reality, wherein a haptic-enabled peripheral 1002, such as a haptic glove, is employed. User A and user B desire to agree to a payment (or other transaction) in a virtual reality environment. User A and user B are represented in the VR environment as avatars 1007 and 1008. These avatars are displayed to the users on a display device 1006 that may be a monitor, a VR headset, or the like. Typically, of course, the users are remote from each other and each has his or her own display device.

As each user moves his or her hand (only finger 1001 is shown to avoid clutter) which is wearing the haptic peripheral such as haptic glove 1002, his or her avatar (1007, 1008 as the case may be) also moves its hand at the same speed and in the same direction. The haptic peripheral 1002 communicates this movement to the peripheral device driver 1004 installed on the local device (desktop, laptop, "smart" phone, tablet, etc.) 1003 via a wired connection or over Bluetooth or other wireless connection (Bluetooth is shown but is a non-limiting example).

Figure 12:
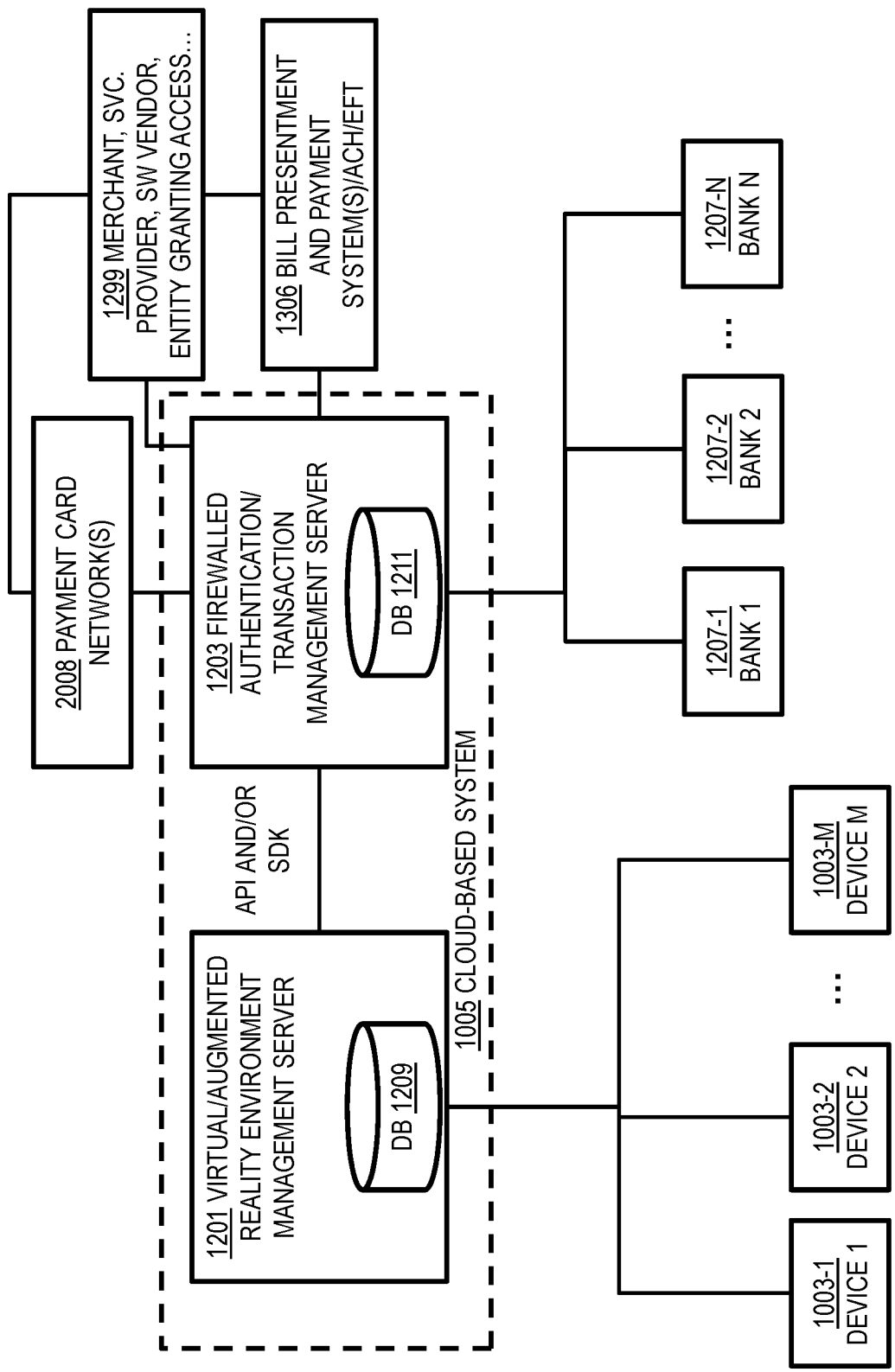
FIG. 12 is a block diagram of an exemplary cloud-based system, according to an aspect of the invention.

Furthermore in this regard, in one or more embodiments, the local glove communicates its movement to the local peripheral device driver. The remote glove/avatar communicates to the device driver of the remote computer and then appropriate communication to the VR environment takes place. Referring now also to FIG. 12, in one or more embodiments, one user (e.g. using device 1003-1) takes an action and his or her action is recognized by the other users (e.g. using devices 1003-2 . . . 1003-M) in the space. For example, each device 1003-1, 1003-2 . . . 1003-M has a peripheral like 1002; that peripheral communicates with the corresponding local device 1003-1, 1003-2 . . . 1003-M (e.g. via corresponding device driver 1004), which talks to a common server (e.g., virtual/augmented reality environment management server 1201). Thus, each participant has a client machine device 1003-1 . . . 1003-M and they are all in communication with a common server 1201.

In one or more embodiments, each local device 1003-1, 1003-2 . . . 1003-M has a browser 599 (discussed below), 897 which renders html that is updated as the server 1201 updates; the server 1201 coordinates the motion of all the avatars. One or more embodiments include a separate and distinct firewalled authentication/transaction management server 1203 that tracks the authenticated users in the session and communicates with the overall environment management server 1201. For example, within a virtual reality environment, two people meet and conduct a transaction via a handshake. In one or more embodiments, the separate server 1203 monitors the whereabouts of authenticated users and communicates the actions of those authenticated users to the overall environment management server 1201. The latter server 1201 controls the VR environment in which the parties meet. The separate server 1203 handles identification and authentication of the consumers, the monitoring of their actions, the settling of the transactions, and the like. In one or more embodiments, separate server 1203 is linked to the VR environment management server 1201 and also to participating banks 1207-1, 1207-2, 1207-N, and optionally one or more payment card networks 2008 and/or one or more electronic bill payment systems (optionally with presentment functionality), with automated clearing house (ACH) and/or other electronic funds transfer (EFT) capability, as at 1306, via interface 1393. The interface to the payment card networks(s) could be provided, for example, via a corresponding one of the services 2051-1 through 2051-N and a corresponding ASP 2050—see FIG. 5.

Thus, movement of peripheral 1002 is interpreted by the device driver 1004 and the avatar 1007, 1008, as the case may be, is moved on the display 1006 for both users. It will be known when the hands of both avatars are in contact with each other (for example a handshake, or "fist-bump," "high-five," etc.) via signals sent back from each peripheral 1002 to the corresponding device driver 1004 and then from the corresponding device to the server 1201, with the positions monitored by the server 1203 (e.g., locations obtained by server 1203 from server 1201 via API and/or software development kit (SDK); file/data structure transfer and/or sharing; or the like).

Device 1003 is connected with server 1201 via a suitable wide-area network, which can be wired, wireless, optical, or some combination thereof, and which will typically include a network of networks commonly known as the Internet. The server 1203 recognizes the "handshake" (or similar) action as a confirmation to complete a transaction and takes the necessary steps to complete the transaction. The server 1203 can then communicate back to the device 1003 via server 1201; the device 1003 then sends a signal to the device driver 1004 to in turn send a signal to the user (e.g. via haptic peripheral 1002) that there has been contact between the avatars. In another aspect, a visual indication/confirmation of contact is employed in addition to, or in lieu of, the haptic confirmation. In one or more embodiments, the VR environment management server 1201 "knows" that there has been contact between the avatars; that server keeps track of the coordinates and orientation of the hands of both the avatars, and also matches with the authenticated transaction management server 1203 to ensure that the two avatars in question have both been authenticated.

Figure 11:
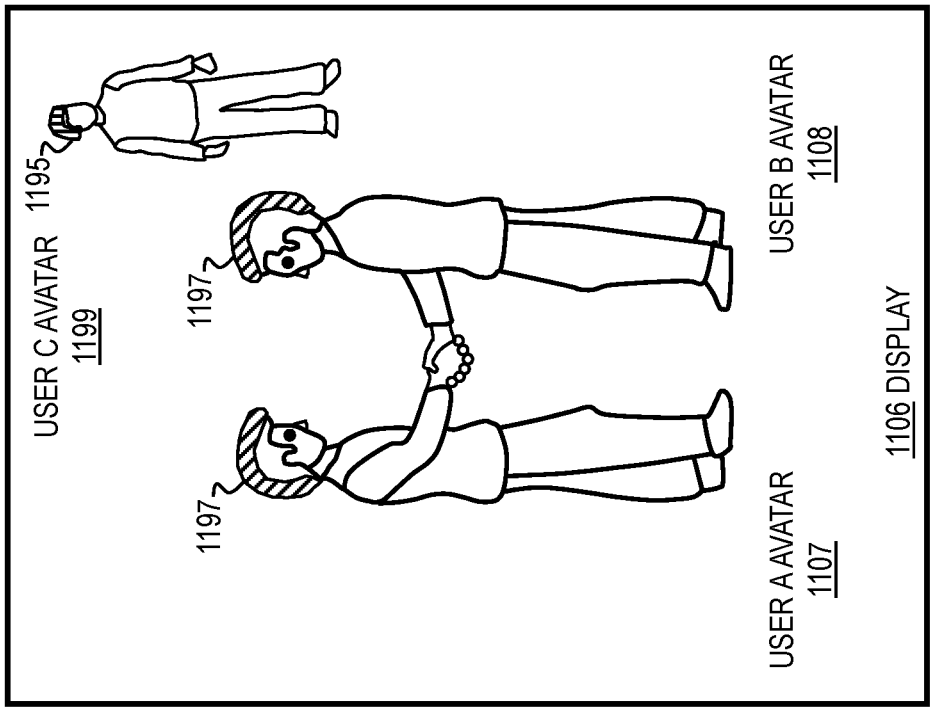
FIG. 11 is a combined block diagram and data flow diagram depicting a second embodiment of a system and method, according to an aspect of the invention.
Figure 11:
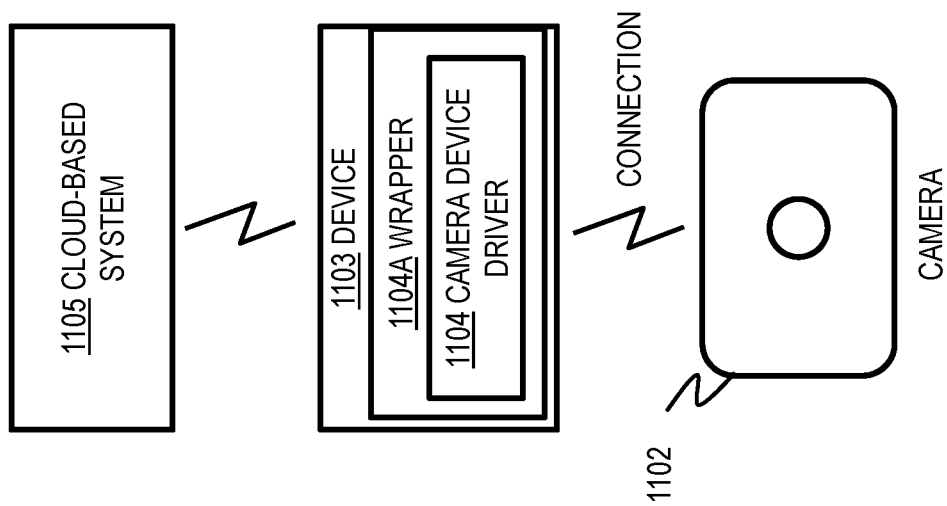

Refer now to FIG. 11, which depicts a second exemplary detailed embodiment of using a handshake to establish a payment contract between two parties in virtual reality, wherein a camera 1102 is employed. Elements analogous to those in FIG. 10 have received the same reference character, incremented by one hundred. Operation is generally similar to that described with respect to FIG. 10, with two pertinent differences in one or more embodiments. Camera 1102 tracks the user's movement and the information obtained from the motion tracking is used by the system to display the user avatar. Feedback to the user is visual, audio (on the device 1103), and/or via vibrations (if the device 1103 is a phone with the ability to vibrate). Regarding the visual feedback, this could be on a separate display (e.g. 1106) or on a display integral with the device 1103—devices 1103 can have integral displays in lieu of or in addition to external displays. Consider, for example, that the aforementioned Samsung Gear VR (available from Samsung Electronics Co., Ltd., Suwon, South Korea) uses a smart phone while the aforementioned Oculus VR (available from Oculus VR, Irvine, Calif., USA) has a built-in display system.

One non-limiting example of a suitable camera is the "Xbox Kinect" motion sensing input device made by Microsoft Corporation, Redmond, Wash., USA, which includes a depth sensor (mapping infrared (IR) images obtained with an infrared projector and IR camera), color camera sensor, and four-element microphone array.

Thus, with continued reference to FIG. 11, in detail, User A and user B desire to agree to a payment (or other transaction) in a virtual reality environment. User A and user B are represented in the VR environment as avatars 1107 and 1108. These avatars are displayed to the users on a display device 1106 that may be a monitor, a VR headset, or the like. Typically, of course, the users are remote from each other and each has his or her own display device.

As each user moves his or her hand, his or her avatar (1107, 1108 as the case may be) also moves its hand at the same speed and in the same direction, based on gesture recognition by the camera 1102. The camera 1102 communicates this movement to the camera device driver 1104 installed on the local device (desktop, laptop, "smart"

phone, tablet, etc.) 1103 via a wired connection or over Bluetooth or other wireless connection (Bluetooth is shown but is a non-limiting example).

Furthermore in this regard, in one or more embodiments, the local camera communicates its movement to the local peripheral device driver. The remote camera/avatar communicates to the device driver of the remote computer and then appropriate communication to the VR environment takes place. Referring now also to FIG. 12, in one or more embodiments, one user (e.g. using device 1003-1) takes an action and his or her action is recognized by the other users (e.g. using devices 1003-2 . . . 1003-M) in the space. Please note that devices 1003-1, 1003-2 . . . 1003-M are representative of device 1003 and device 1103; also, system 1005 in FIG. 12 is also representative of system 1105 in FIG. 11. In a non-limiting example, each device 1003-1, 1003-2 . . . 1003-M has a peripheral camera like 1102; that peripheral communicates with the corresponding local device 1003-1, 1003-2 . . . 1003-M (e.g. via corresponding device driver 1104), which talks to a common server (e.g., virtual/augmented reality environment management server 1201). Thus, each participant has a client machine device 1003-1 . . . 1003-M and they are all in communication with a common server 1201.

In one or more embodiments, each local device 1003-1, 1003-2 . . . 1003-M has a browser 599, 897 which renders html that is updated as the server 1201 updates; the server 1201 coordinates the motion of all the avatars. One or more embodiments include a separate and distinct firewalled authentication/transaction management server 1203 as described above, which tracks the authenticated users in the session and communicates with the overall environment management server 1201. For example, within a virtual reality environment, two people meet and conduct a transaction via a handshake. In one or more embodiments, the separate server 1203 monitors the whereabouts of authenticated users and communicates the actions of those authenticated users to the overall environment management server 1201. The latter server 1201 controls the VR environment in which the parties meet. The separate server 1203 handles identification and authentication of the consumers, the monitoring of their actions, the settling of the transactions, and the like. In one or more embodiments, as noted above, separate server 1203 is linked to the VR environment management server 1201 and also to participating banks 1207-1, 1207-2, 1207-N, and optionally one or more payment card networks 2008 and/or one or more electronic bill payment systems (optionally with presentment functionality), with automated clearing house (ACH) and/or other electronic funds transfer (EFT) capability.

Thus movement detected by camera 1102 is interpreted by the device driver 1104 and the avatar 1107, 1108, as the case may be, is moved on the display 1106 for both users. It will be known when the hands of both avatars are in contact with each other (for example a handshake, or "fist-bump," "high-five," etc.) via signals sent back from each camera 1102 to the corresponding device driver 1104 and then from the corresponding device to the server 1201, with the positions monitored by the server 1211 (e.g., locations obtained by server 1203 from server 1201 via API and/or SDK); file/data structure transfer and/or sharing; or the like).

Device 1103 is connected with server 1201 via a suitable wide-area network, which can be wired, wireless, optical, or some combination thereof, and which will typically include a network of networks commonly known as the Internet. The server 1203 recognizes the "handshake" (or similar) action as a confirmation to complete a transaction and takes the necessary steps to complete the transaction. The server 1203 can then communicate back to the device 1103 via server 1201; the device 1103 then provides appropriate feedback to confirm contact between the avatars; such can be visual, audio (on the device 1103), and/or via vibrations (if the device 1103 is a phone with the ability to vibrate). Regarding the visual feedback, this could be on a separate display (e.g. 1106) or on a display integral with the device 1103—devices 1103 can have integral displays in lieu of or in addition to external displays.

As noted, in one or more embodiments, server 1203 includes interfaces with one or more payment card networks 2008 and/or one or more electronic bill payment systems (optionally with presentment functionality), with automated clearing house (ACH) and/or other electronic funds transfer (EFT) capability (e.g. wire transfer), as shown at 1306.

Some embodiments include a database that stores data defining the pre-agreed-upon gesture. As noted, some embodiments do not involve two parties agreeing on their own "secret handshake." Indeed, one or more embodiments function without the two transacting parties needing to have a shared secret between them. Rather, in one or more embodiments, users enter the VR environment, a central server 1203 authenticates all of the parties, and there are one or more transparent universally-defined gestures or gesture sequences that signify acceptance of the "deal." Some embodiments, however, could allow users to modify and register alternative gestures. For example, this could be done to drive consumer interest—a seller of sports equipment might require each party to "spike" a football in the VR "end zone"; a purveyor of books, videos, and/or other merchandise related to young adult fantasy stories dealing with magic, wizards, etc. might require each party to "wave a magic wand." Thus, in one or more alternative embodiments, the system can customize the interaction and "push" the permission down to, e.g., the peripheral. One or more databases in the cloud are provided in one or more embodiments. Furthermore, in one or more embodiments, a pre-registration procedure defines additional "custom" gestures signifying acceptance. For example, database 1209 on or associated with server 1201 includes the definitions of standard and/or custom gestures or gesture sequences signifying acceptance, the types of feedback to be given (possibly customized based on user preference and/or availability of certain kinds of peripherals), and the like, while database 1211 associated with server 1203 includes authentication data such as passwords, biometric credentials, user profiles, and the like.

The haptic peripheral 1002 may also serve as a pointing device; for example, the individual whose finger 1001 is shown interacting with the peripheral 1002 is on a web page implementing the VR environment. Pertinent data includes the coordinates of the corresponding avatar's location on the screen and the orientation of the avatar's hand (in a handshake embodiment). When the VR environment is web-based, a web page rendered in a web browser on device 1003, 1103 casts back the location and orientation of the avatar's hand to the local device, for the "remote" avatar.

Note that some X Box controllers and gaming mice have the ability to vibrate. However, they may not have the fine guidance capability of a haptic glove or the like. They could be used, for example, to provide confirmatory feedback in conjunction with the camera embodiment of FIG. 11.

Peripherals 1002, 1102 have device drivers 1004, 1104. The peripherals will be connected to the user's machine by, for example, a USB cable, Wi-Fi, Bluetooth, or the like. Where the peripherals have pointing capability like a mouse, the device 1003, 1103 will "think" that it is talking to a mouse. Essentially, the user's hand movements will be reflected by movement of the avatar. For all intents and purposes, the machine merely "thinks" that it is connected to some kind of pointer device; it just so happens that in one or more embodiments, the pointer is a haptic device; e.g., haptic-enabled glove, pen, tablet, mouse, etc. The device drivers 1002, 1102 each have a channel built in for communication with the system 1005, 1105. In some instances, camera 1102 detects hand gestures and functions as a pointer. For example, in the Microsoft HoloLens mixed reality smart glasses developed and manufactured by Microsoft Corporation, Redmond, Wash., USA, sensual and natural interface commands can be employed, such as gaze, gesture, and voice. Gaze commands, such as head-tracking, allows the user to bring application focus to whatever the user perceives. "Elements"—or any virtual application or button—are selected using an air tap method, similar to clicking an imaginary computer mouse. The tap can be held for a drag simulation to move an element, as well as voice commands for certain commands and actions. For example, the user can "point" with his or her finger and thumb and can "single click" by touching the thumb and forefinger once and "double click" by touching the thumb and forefinger twice.

The systems 1005, 1105 can reside in the cloud (examples of such systems are given in FIG. 12) and can be managed, for example, by an entity such as Mastercard International Incorporated or other operator of a payment card network and/or bill payment network (optionally with presentment functionality), or a similar entity, or could correspond to any other type of entity. Servers 1201, 1203 could be run by the same or different parties. In some instances, server 1203 might be run by a party such as Mastercard International Incorporated, with expertise in secure electronic commerce, while server 1201 might be run by a party with expertise in VR and/or AR hardware and/or software. In another aspect, both servers might be run by a party such as Mastercard International Incorporated, with expertise in secure electronic commerce, and with an API or other suitable interface provided to a party with expertise in VR and/or AR hardware and/or software.

Aspects of the invention can be applied to other types of actions besides electronic commerce transactions. For example, embodiments can be used for access control within the digital space—a user can be allowed into certain places and/or have certain permissions, based on a successful VR handshake (or other gesture) and authentication. In another example, embodiments could be used to control access to software, such as technical and/or business software.

It is worth noting that the device drivers 1004, 1104 are in some instances developed by the peripheral manufacturers. In some cases, the peripheral manufacturers cooperate with the operator of server 1201 to include capability for handshake (or other gesture) recognition. In other instances, cooperative functionality is provided by the operator of server 1201 to facilitate working with the peripherals and their (unmodified, e.g.) drivers—a suitable SDK, module, package, or the like—in the non-limiting examples of FIGS. 10 and 11 the solution is architected with a software wrapper 1004A, 1104A around each device driver to facilitate cooperation between the peripheral device driver and the server 1201.

Regarding cloud-based systems 1005, 1105, cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction, as the skilled artisan will appreciate from, for example, Peter Mell and Timothy Grance, NIST Special Publication 800-145, The NIST Definition of Cloud Computing, September 2011, expressly incorporated herein by reference in its entirety for all purposes. System 1005 of FIG. 12 is generally also representative of system 1105 of FIG. 11; the specific architecture with servers 1201, 1203 and databases 1209, 1211 is exemplary and non-limiting. Architecting the solution as shown in FIG. 12 with the functionality split between servers 1201, 1203 provides significant technical benefits. For example, scalability is enhanced as authentication server 1203 can authenticate for a variety of use cases other than the virtual/augmented reality environment; e.g., payment card transactions, bill payment transactions, and the like. Furthermore, rapid and flexible changeability of rules and/or biometric parameters is also facilitated—the definition of the gesture sequence can thus be separated from the use to which it will be put. Exemplary uses include initiating a transaction or other action (e.g., document share, entering into a contract, sharing contact details); gaming; logging occurrence of an event; and the like.

Examples of suitable virtual reality gloves include the Manus VR Glove, which is a high-end data glove that brings intuitive interaction to virtual reality, and is available from Manus VR, Eindhoven, Netherlands; and the "VRgluv" virtual reality glove available from VRgluv, LLC, Atlanta, Ga., USA. The non-limiting example in FIG. 10 shows a haptic-enabled peripheral enclosing a user's finger and functioning as a pointer. This represents, for example, an active portion of a virtual reality glove or the like. Other embodiments can use different approaches. Game controllers such as X Box and Play Station controllers may provide suitable haptic feedback in some instances. Wearable device such as an Apple Watch can provide a haptic "jolt." These latter examples may server, for example, to provide confirmation in the camera embodiment of FIG. 11.

Other approaches can be used in different embodiments. For example, in some embodiments, the consumer may wear a full haptic glove; may interact with a screen or with augmented reality using a virtual (VR) or augmented reality (AR) headset, goggles, glasses, projection screen, or the like. Embodiments are thus not necessarily limited to desktop- or laptop-only experiences. The use of hand(s) and glove(s) with haptic feedback is a non-limiting example of recognizing pre-defined gestures in a VR environment and/or providing feedback to confirm recognition of such gestures.

In some instances, tactile feedback can be employed with a smart phone (e.g. 800) or other device by providing a sense of pressure or vibration on the user's hand as he or she navigates around a screen (e.g. touch screen) or augmented reality (AR) environment or virtual reality (VR) environment. In this aspect, the user wears a haptic glove with an open fingertip or with a special fingertip that works with the touch screen. For example, one or more fingertips of the haptic glove, or even the entire glove, can be made from a special conductive micro-fiber woven into a glove liner, to bridge the conductive gap your gloves create between the user and his or her device. The user's location on the screen is sensed based on his or her fingertip, in the usual manner, and conveyed to the device driver for control of the haptic glove. See discussion of FIG. 9.

For the avoidance of doubt, references to "Mastercard," "an entity such as Mastercard International Incorporated,"

and the like, unless expressly stated to be limited to Mastercard, are intended to be exemplary of an operator of a payment card network and/or bill presentment and payment system, as will be appreciated by the skilled artisan from the context, whether or not qualified by words such as "or other operator"; in some embodiments, such an entity may also host part or all of the systems 1005, 1105.

One or more embodiments are not limited to commerce/purchase transactions. For example, some embodiments pertain to access control within the digital space; controlling access to software, such as technical and/or business software; and the like.

In one or more embodiments, there are profiles associated just with the peripheral—the peripheral works in this way, can provide this kind of stimulus and needs this kind of command. There is the option of further personalizing to the user; e.g., the user wants a two-second gentle vibration to confirm the "handshake"; or the user does not want haptic confirmation even though the peripheral is capable of it. Such profiles could be stored, for example, in database 1209; in some instances, the profiles work together with the wrappers 1004A, 1104A.

Recapitulation

Given the discussion thus far, it will be appreciated that, in general terms, an exemplary method includes causing, with a virtual/augmented reality environment management server 1201, first and second computer display devices (e.g., two instances of 1006 or two instances of 1106) associated with first and second remote client computing devices (e.g. two instances of 1003 or two instances of 1103) to each display first and second avatars 1007, 1008 or 1107, 1108 in at least one of a virtual reality environment and an augmented reality environment. The first and second avatars represent first and second human users of the first and second remote client computing devices. The at least one of a virtual reality environment and an augmented reality environment can, but need not necessarily, utilize VR/AR headsets and/or goggles; in some instances, a conventional monitor and pointing device (e.g. mouse) can be employed.

A further step includes obtaining, at the virtual/augmented reality environment management server, data indicating that a predetermined gesture sequence has occurred between the first and second avatars. In one or more embodiments, the peripheral device driver 1004, 1104, executing on the remote client computing device, only gets data defining gestures of the avatar corresponding to its local user, while the virtual/augmented reality environment management server manages the avatars. Servers 1201 and 1203 can be coupled, for example, via an API, an SDK, or the like.

In a further step, in reliance on the data indicating that the predetermined gesture sequence has occurred between the first and second avatars, the virtual/augmented reality environment management server causes an authentication/transaction management server 1203 to take at least one action outside the at least one of a virtual reality environment and an augmented reality environment.

An even further step includes the virtual/augmented reality environment management server causes a confirmation, at the first and second remote client computing devices, that the action taken in reliance on the data indicating that the predetermined gesture sequence has occurred. For example, haptic gloves could "buzz" in a predetermined manner; for camera peripheral embodiments a light could flash, or the like.

As used herein, a virtual/augmented reality environment management server is a server that manages at least one of a virtual reality environment and an augmented reality environment.

In one or more embodiments, in the step of causing the display of the first and second avatars, the at least one of a virtual reality environment and an augmented reality environment is a virtual reality environment.

In some instances, as in FIG. 10, the predetermined gesture sequence is initiated using first and second haptic peripheral device drivers (e.g. two instances of 1004), on the first and second remote client computing devices, coupled to first and second haptic peripherals (e.g. two instances of 1002), and in the step of causing the confirmation, the haptic peripheral device drivers in turn cause confirmation of the action taken in reliance on the data indicating that the predetermined gesture sequence has occurred by causing the first and second haptic peripherals to provide haptic confirmation to, respectively, the first and second human users. For example, the haptic peripheral can be a glove, and the confirmation can be a squeeze simulating a handshake, or a "buzz." Each user can receives a hand squeeze or "buzz" from the haptic glove connected to his or her machine.

In some cases, as in FIG. 11, the predetermined gesture sequence is initiated using first and second camera drivers (e.g. two instances of 1104), on the first and second remote client computing devices, coupled to first and second cameras (e.g. two instances of 1102) and, in the step of causing the confirmation, the first and second remote client computing devices in turn cause confirmation of the action taken in reliance on the data indicating that the predetermined gesture sequence has occurred between the first and second avatars by at least one of: (i) visual display on at least one of the first and second display devices 1106; (ii) visual display on at least one of the first and second computing devices 1103; (iii) audio on at least one of the first and second remote client computing devices; and (iv) vibration on at least one of the first and second remote client computing devices (e.g., if the device 1103 is a phone with the ability to vibrate). The visual display could include, e.g., the hand turning green when the handshake was successful.

In another aspect, one remote client may use a haptic peripheral and one uses a camera. In this aspect, the predetermined gesture sequence is initiated using a haptic peripheral device driver and a camera driver, on the first and second remote client computing devices, respectively, coupled to a haptic peripheral and a camera. In the step of causing the confirmation, the haptic peripheral device driver in turn causes confirmation of the action taken in reliance on the data indicating that the predetermined gesture sequence has occurred by causing the haptic peripheral 1002 to provide haptic confirmation to the first human user; and the second remote client computing device 1103 in turn causes confirmation of the action taken in reliance on the data indicating that the predetermined gesture sequence has occurred between the first and second avatars by at least one of: (i) visual display on at least one of: the second computer display device; and the second remote client computing device; (ii) audio on the second remote client computing device; and (iii) vibration on the second remote client computing device.

In some cases, in the step of obtaining, at the virtual/augmented reality environment management server, the data indicating that the predetermined gesture sequence has occurred, the predetermined gesture sequence can, in some instances, include each of the first and second avatars engaging in a similar gesture (e.g., handshake between the first and second avatars). Other examples such as first bumps, etc., are discussed elsewhere herein.

In some cases, in the step of obtaining, at the virtual/augmented reality environment management server, the data indicating that the predetermined gesture sequence has occurred, the predetermined gesture sequence is a pre-agreed sequence, and a further step can include storing the pre-agreed sequence in a database 1209 during a pre-registration step. In other cases, the predetermined gesture sequence can be specified by a third party and/or can include a commonly-accepted sequence indicating assent, such as a handshake.

Where appropriate, under applicable laws defining the quantum of assent needed to create a binding contract, users can explicitly indicate during a pre-registration stage assent to be bound by properly-executed VR handshakes or other VR gesture sequences.

In some cases, such as when there are one or more additional avatars 1095, 1195, representing one or more additional humans, in the VR environment, it may be desirable if the pre-agreed sequence is not understandable to the third human user. For example, the first and second users may define a sequence of gestures which they understand to indicate assent but which do not appear as such to third parties (one raises right hand, other puts left hand out straight, e.g.).

In the step of obtaining, at the virtual/augmented reality environment management server, the data indicating that the predetermined gesture sequence has occurred, the predetermined gesture sequence can thus, in some instances, include the first and second avatars engaging in different gestures.

In one or more embodiments, the first and second human users undertake an authentication process prior to entry into the virtual reality environment, and the virtual/augmented reality environment management server causes the action to be taken in further reliance on the authentication. The "handshake" (or other gesture sequence) can be thought of as an instruction to take some action; e.g., to use the credentials (already proven/authenticated) to carry out a transaction or the like. In some instances (for example, if a user has been in the VR/AR environment for some significant period of time (say, 25 minutes) after the initial authentication), the user is required to re-authenticate prior to completing the transaction. Database 1211 of server 1203 may hold a value, for example, specifying for how long an authentication is valid.

As noted, the action in reliance on the data indicating that the predetermined gesture sequence has occurred could be a monetary transaction, an electronic calendar entry for an agreed-to meeting, or the like. In the case of a purchase transaction, a suitable mechanism can be provided to record the order details, amount, time, authentication status, etc. For example, a network connection is provided from server 1203 to a merchant (provider of goods), service provider, software vendor, entity to access, or the like (whatever is being purchased/accessed based on the "haptic handshake" or other gesture sequence), generally represented as 1299. Note that payment card network 2008 and BPPS 1306 can interface directly with server 1203 and/or indirectly via entity 1299.

Some embodiments further include displaying, in connection with the first and second avatars, an indication that the corresponding first and second human users accept the predetermined gesture as causing the virtual/augmented reality environment management server to cause the action to be taken in reliance on the data indicating that the predetermined gesture sequence has occurred. In the non-limiting examples of FIGS. 10 and 11, avatars A and B each have a green "halo" 1097, 1197 indicating that they can transact via "haptic handshake" or the like. Hatching at a downward 45 degree angle is used to symbolize green.

Furthermore in this regard, some embodiments include causing each of the first and second computer display devices associated with first and second remote client computing devices to display a third avatar 1095, 1195 in the virtual reality environment. The third avatars represent a third human user, and the pre-agreed sequence is not understandable to the third human user. In such instances, an additional step can include displaying, in connection with the third avatar, an indication that the corresponding third human user does not accept the predetermined gesture as causing the virtual/augmented reality environment management server to cause the action to be taken in reliance on the data indicating that the predetermined gesture sequence has occurred. For example, avatars that accept the "handshake" may have a green halo 1097, 1197 while avatars that do not accept the "handshake" may have a red halo 1095, 1195. Vertical hatching is used to symbolize red. In some instances, the indications may be implicit (avatars that accept the "handshake" may have a green halo while avatars that do not accept the "handshake" may have no halo, or avatars that accept the "handshake" may have no halo while avatars that do not accept the "handshake" may have a red halo). Other indications could be used in other embodiments; e.g., avatars that accept the "handshake" could have a "virtual acceptance mark" appended on or nearby such as "haptic handshake accepted here" or menu and/or other text associated with avatars that do not accept the "handshake" could be grayed-out.

Regarding the data indicating that the predetermined gesture sequence has occurred between the first and second avatars, in some instances, the data includes a binary flag indicating that a local determination has been made that a particular avatar has completed the required gesture sequence (e.g., pattern recognition on the motions of the avatar is conducted locally by driver 1004/1104 and/or wrapper 1004A/1104A). In one or more embodiments, server 1201 obtains an affirmative binary flag from each party to the transaction. On the other hand, in other instances "raw" data could be obtained. For example, the data indicating that the predetermined gesture sequence has occurred between the first and second avatars could include motion-indicating data indicative of at least a portion (e.g. hands) of motion of the first and second avatars. A further step could include analyzing the motion-indicating data to determine that the predetermined gesture sequence has occurred between the first and second avatars (for example, via pattern recognition conducted by server 1201). Pattern recognition systems can be trained with a training corpus and tested with a test corpus in a known manner, on the devices and/or servers.

In another aspect, an exemplary method includes obtaining, from a remote virtual/augmented reality environment management server 1201, at a client computing device 1003, 1103, having an associated computer display device 1006, 1106, instructions causing the computer display device to display first and second avatars 1007, 1008; 1107, 1108 in at least one of a virtual reality environment and an augmented reality environment. The first and second avatars respectively represent a human user of the client computing device and a remote human user in the at least one of a virtual reality environment and an augmented reality environment. A further step includes providing, to the remote virtual/augmented reality environment management server, from the client computing device, at least a portion (another portion could be obtained from another client, for example) of data indicating that a predetermined gesture sequence has occurred between the first and second avatars, to cause the remote virtual/augmented reality environment management server, in reliance on the at least portion of data indicating that the predetermined gesture sequence has occurred between the first and second avatars, to in turn cause an authentication/transaction management server 1203 to take at least one action outside the at least one of a virtual reality environment and an augmented reality environment.

Further steps include obtaining, from the remote virtual/augmented reality environment management server, at the client computing device, a confirmation of the action taken in reliance on the data indicating that the predetermined gesture sequence has occurred; and providing to the human user of the client computing device, based on the confirmation, at least one of a visual indication, an audio indication, and a haptic indication.

It is worth noting that, in some embodiments, a firewall is provided between server 1203 and database 1211. A skilled artisan, given the teachings herein, will be able to architect appropriate firewall functionality.

Also contemplated are systems and/or apparatuses as disclosed herein. For example, an apparatus could include a device 1003, 1103 including a memory 812 or 530 (discussed below); and at least one processor 802 or 520 (discussed below), coupled to the memory, and operative to carry out any one, some, or all of the method steps described herein. In some instances, the apparatus also includes a haptic-enabled peripheral device (e.g., 1002) with a device driver 1004 as described, or a camera 1102 with a camera device driver 1104 as described. FIG. 3, discussed below, is generally representative of one form of device 1003, 1103 with associated peripherals and drivers, as well as of servers 1201, 1203. Servers may not have displays, peripherals, etc. as discussed in connection with devices 1003, 1103. FIG. 9 is generally representative of alternative forms of devices 1003, 1103 with associated peripherals and drivers.

System can include described apparatuses with displays 1006, 1106 coupled to cloud-based systems 1005, 1105 by suitable networks, for example.

Devices with touch screens may have an appropriate screen driver or the like to integrate with a haptic glove or the like.

For example, an exemplary virtual/augmented reality environment management server 1201 can be provided configured to interface with an authentication/transaction management server 1211 and a plurality of remote client computing devices 1003, 1103. The virtual/augmented reality environment management server includes a memory such as 530; an interface (e.g., API/SDK) to the authentication/transaction management server and the plurality of remote client computing devices; and at least one processor such as 520, coupled to the memory and the interface, and operative to cause first and second computer display devices (e.g., 1006 and/or 1106) associated with first and second ones of the remote client computing devices 1003 and/or 1103 to each display first and second avatars 1007, 1008; 1107, 1108 in at least one of a virtual reality environment and an augmented reality environment. The first and second avatars represent first and second human users of the first and second remote client computing devices. The at least one processor is further operative to obtain data indicating that a predetermined gesture sequence has occurred between the first and second avatars; and, in reliance on the data indicating that the predetermined gesture sequence has occurred between the first and second avatars, cause the authentication/transaction management server to take at least one action outside the at least one of a virtual reality environment and an augmented reality environment. The at least one processor is still further operative to cause a confirmation at the first and second ones of the remote client computing devices, of the action taken in reliance on the data indicating that the predetermined gesture sequence has occurred.

In another example, an exemplary client computing device (e.g., 500, 800, 1003, 1103) includes a memory 530, 812; and at least one processor 520, 802, coupled to the memory, and operative to obtain, from a remote virtual/augmented reality environment management server 1201, instructions causing a computer display device 1006, 1106 associated with the client computing device to display first and second avatars 1007, 1008; 1107, 1108 in at least one of a virtual reality environment and an augmented reality environment. The first and second avatars respectively represent a human user of the client computing device and a remote human user in the at least one of a virtual reality environment and an augmented reality environment. The at least one processor is further operative to provide, to the remote virtual/augmented reality environment management server, from the client computing device, at least a portion (another portion could come from another client, for example) of data indicating that a predetermined gesture sequence has occurred between the first and second avatars, to cause the remote virtual/augmented reality environment management server, in reliance on the at least portion of data indicating that the predetermined gesture sequence has occurred between the first and second avatars, to in turn cause an authentication/transaction management server 1203 to take at least one action outside the at least one of a virtual reality environment and an augmented reality environment. The at least one processor is still further operative to obtain, from the remote virtual/augmented reality environment management server, at the client computing device, a confirmation of the action taken in reliance on the data indicating that the predetermined gesture sequence has occurred; and provide to the human user of the client computing device, based on the confirmation, at least one of a visual indication, an audio indication, and a haptic indication.

System and Article of Manufacture Details

Embodiments of the invention can employ hardware and/or hardware and software aspects. Software includes but is not limited to firmware, resident software, microcode, etc.

Software might be employed, for example, in connection with one or more modules to implement at least a portion of one or more of the elements of the systems and/or flows of FIGS. 10-12; a terminal 122, 124, 125, 126; a reader 132; a host, server, and/or processing center 140, 142, 144 (optionally with data warehouse 154) of a merchant, issuer, acquirer, processor, other third party, or operator of a network 2008, system 1306, and/or system 1005, 1105; and the like. Firmware might be employed, for example, in connection with payment devices such as cards 102, 112, as well as reader 132. Systems 1005, 1105 can, for example, include two or more servers 1201, 1203, each of which can be implemented by a system 500 discussed immediately below.

FIG. 3 is a block diagram of a system 500 that can implement part or all of one or more aspects or processes of the invention. As shown in FIG. 3, memory 530 configures the processor 520 (which could correspond, e.g., to processor portions 106, 116, 130; a processor of a terminal or a reader 132; processors of remote hosts in centers 140, 142, 144; processors of a merchant, issuer, acquirer, processor, other third party, or operator of a network 2008, system 1306, and/or systems and/or flows of FIGS. 10-12, system 1005, 1105; and the like); to implement one or more aspects of the methods, steps, and functions disclosed herein (collectively, shown as process 580 in FIG. 3). Different method steps can be performed by different processors. The memory 530 could be distributed or local and the processor 520 could be distributed or singular. The memory 530 could be implemented as an electrical, magnetic or optical memory, or any combination of these or other types of storage devices (including memory portions as described above with respect to cards 102, 112). It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an application specific integrated circuit (ASIC) or field programmable gate array (FPGA) rather than using firmware. Display 540 is representative of a variety of possible input/output devices (e.g., displays, printers, keyboards, mice, touch screens, touch pads, and so on).

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a recordable medium (non-transitory storage), examples of which are set forth above, but does not encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on one, some, or all of elements 122, 124, 125, 126, 140, 142, 144, 2004, 2006, 2008, 2010; on a computer implementing aspects of network 2008, system 1306, and/or system 1005, 1105, and/or systems and/or flows of FIGS. 10-12; on processors of hosts and/or servers of other parties described herein; and the like. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 122, 124, 125, 126, 140, 142, 144, 2004, 2006, 2008, 2010; a computer implementing aspects of network 2008, system 1306, and/or system 1005, 1105, and/or systems and/or flows of FIGS. 10-12; hosts and/or servers of other parties described herein; and the like, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program product comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 500 as shown in FIG. 3) running a server program. It will be understood that such a physical server may or may not include a display, keyboard, or other input/output components. A "host" includes a physical data processing system (for example, system 500 as shown in FIG. 3) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. The method steps can be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Thus, aspects of the invention can be implemented, for example, by one or more appropriately programmed general purpose computers, such as, for example, servers, mobile devices, or personal computers, located at one or more of the entities in the figures, as well as within the payment network 2008, system 1306, system 1005, 1105 and/or systems and/or flows of FIGS. 10-12. Such computers can be interconnected, for example, by one or more of payment network 2008, another VPN, the Internet, a local area and/or wide area network (LAN and/or WAN), via an EDI layer, and so on. Note that element 2008 represents both the network and its operator. The computers can be programmed, for example, in compiled, interpreted, object-oriented, assembly, and/or machine languages, for example, one or more of C, C++, Java, Visual Basic, COBOL, Assembler, Structured Query Language (SQL), and the like (an exemplary and non-limiting list), and can also make use of, for example, Extensible Markup Language (XML), known application programs such as relational database applications (e.g., IBM DB2® software available from International Business Machines Corporation, Armonk, N.Y., US; SAS® software available from SAS Institute, Inc., Cary, N.C., US), spreadsheets (e.g., MICROSOFT EXCEL® software available from Microsoft Corporation, Redmond, Wash., US), and the like. The computers can be programmed to implement the logic and/or data flow depicted in the figures. In some instances, messaging and the like may be in accordance with the International Organization for Standardization (ISO) Specification 8583 *Financial transaction card originated messages—Interchange message specifications* and/or the ISO 20022 or UNIFI Standard for Financial Services Messaging, also incorporated herein by reference in its entirety for all purposes. In one or more embodiments, some messages may be in accordance with NACHA Automated Clearing House (ACH) rules and regulations.

Browser program 599 in memory 530, when system 500 represents a client, deciphers hypertext markup language (html) served out by a server such as system 500 representing a server for display on display 840 or the like. Memory 530 can also include appropriate device drivers as discussed elsewhere herein, omitted to avoid clutter. A suitable wired (e.g. USB) and/or wireless (e.g. Bluetooth) interface can be provided for peripheral devices, and is generally represented at 597. This permits interfacing with a haptic glove 593, VR goggles 591, and/o external camera 595, in a manner similar to that discussed in connection with FIG. 9.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   causing, with a virtual/augmented reality environment management server, first and second computer display devices associated with first and second remote client computing devices to each display first and second avatars in at least one of a virtual reality environment and an augmented reality environment, said first and second avatars representing first and second human users of said first and second remote client computing devices;
   creating and storing a pre-agreed gesture sequence in a database for at least one of said virtual reality environment and said augmented reality environment during a pre-registration step, to be used as a predetermined gesture sequence, wherein a sequence of gestures defined by said first human user and said second human user is used as the predetermined gesture sequence;
      obtaining, at said virtual/augmented reality environment management server, data indicating that said predetermined gesture sequence has occurred between said first and second avatars;
      in reliance on said data indicating that said predetermined gesture sequence has occurred between said first and second avatars, said virtual/augmented reality environment management server causing an authentication/transaction management server to take at least one action outside said at least one of said virtual reality environment and said augmented reality environment; and
   causing a confirmation, with said virtual/augmented reality environment management server, at said first and second remote client computing devices, that said action taken in reliance on said data indicating that said predetermined gesture sequence has occurred;
   wherein the sequence of gestures defined by said first human user and said second human user to be used as the predetermined gesture sequence comprises said first and second avatars engaging in different gestures and wherein, in said step of obtaining, at said virtual/augmented reality environment management server, said data indicating that said predetermined gesture sequence has occurred, said predetermined gesture sequence comprises said first and second avatars engaging in the different gestures.

2. The method of claim 1, wherein, in said step of causing said display of said first and second avatars, said at least one of a virtual reality environment and an augmented reality environment comprises a virtual reality environment.

3. The method of claim 2, wherein:
   said predetermined gesture sequence is initiated using first and second haptic peripheral device drivers, on said first and second remote client computing devices, coupled to first and second haptic peripherals; and
   in said step of causing said confirmation, said haptic peripheral device drivers in turn cause confirmation of said action taken in reliance on said data indicating that said predetermined gesture sequence has occurred by causing said first and second haptic peripherals to provide haptic confirmation to, respectively, said first and second human users.

4. The method of claim 2, wherein:
   said predetermined gesture sequence is initiated using first and second camera drivers, on said first and second remote client computing devices, coupled to first and second cameras; and
   in said step of causing said confirmation, said first and second remote client computing devices in turn cause confirmation of said action taken in reliance on said data indicating that said predetermined gesture sequence has occurred between said first and second avatars by at least one of:
   visual display on at least one of:
      said first and second computer display devices; and
      said first and second remote client computing devices;
   audio on at least one of said first and second remote client computing devices; and
   vibration on at least one of said first and second remote client computing devices.

5. The method of claim 2, wherein:
   said predetermined gesture sequence is initiated using a haptic peripheral device driver and a camera driver, on said first and second remote client computing devices, respectively, coupled to a haptic peripheral and a camera; and
   in said step of causing said confirmation:
      said haptic peripheral device driver in turn causes confirmation of said action taken in reliance on said data indicating that said predetermined gesture sequence has occurred by causing said haptic peripheral to provide haptic confirmation to said first human user; and said second remote client computing device in turn causes confirmation of said action taken in reliance on said data indicating that said predetermined gesture sequence has occurred between said first and second avatars by at least one of:
visual display on at least one of:
said second computer display device; and
said second remote client computing device;
audio on said second remote client computing device; and
vibration on said second remote client computing device.

6. The method of claim 2, wherein, in said step of obtaining, at said virtual/augmented reality environment management server, said data indicating that said predetermined gesture sequence has occurred, said predetermined gesture sequence comprises each of said first and second avatars engaging in a similar gesture.

7. The method of claim 6, wherein, in said step of obtaining, at said virtual/augmented reality environment management server, said data indicating that said predetermined gesture sequence has occurred, said predetermined gesture sequence comprises a handshake between said first and second avatars.

8. The method of claim 2, further comprising said first and second human users undertaking an authentication process prior to entry into said virtual reality environment, wherein said virtual/augmented reality environment management server takes said action in further reliance on said authentication.

9. The method of claim 2, further comprising displaying, in connection with said first and second avatars, an indication that said corresponding first and second human users accept said predetermined gesture sequence as causing said virtual/augmented reality environment management server to take said action in reliance on said data indicating that said predetermined gesture sequence has occurred.

10. The method of claim 9, further comprising:
causing each of said first and second computer display devices associated with first and second remote client computing devices to display a third avatar in said virtual reality environment, said third avatars representing a third human user, wherein said pre-agreed gesture sequence is not understandable to said third human user; and
displaying, in connection with said third avatar, an indication that said corresponding third human user does not accept said predetermined gesture sequence as causing said virtual/augmented reality environment management server to take said action in reliance on said data indicating that said predetermined gesture sequence has occurred.

11. The method of claim 2, wherein said action in reliance on said data indicating that said predetermined gesture sequence has occurred comprises a monetary transaction.

12. The method of claim 2, wherein said action in reliance on said data indicating that said predetermined gesture sequence has occurred comprises an electronic calendar entry for an agreed-to meeting.

13. The method of claim 2, wherein in said step of obtaining, at said virtual/augmented reality environment management server, said data indicating that said predetermined gesture sequence has occurred between said first and second avatars, said data comprises a binary flag indicating that a local determination has been made that a given one of said first and second avatars has completed said predetermined gesture sequence.

14. The method of claim 2, wherein in said step of obtaining, at said virtual/augmented reality environment management server, said data indicating that said predetermined gesture sequence has occurred between said first and second avatars, said data comprises motion-indicating data indicative of at least a portion of motion of said first and second avatars, further comprising analyzing said motion-indicating data to determine that said predetermined gesture sequence has occurred between said first and second avatars.

15. The method of claim 1, further comprising causing each of said first and second computer display devices associated with first and second remote client computing devices to display a third avatar in said virtual reality environment, said third avatars representing a third human user, wherein said pre-agreed gesture sequence is not understandable to said third human user.

16. A virtual/augmented reality environment management server configured to interface with an authentication/transaction management server and a plurality of remote client computing devices, said virtual/augmented reality environment management server comprising:
a memory;
an interface to the authentication/transaction management server and the plurality of remote client computing devices; and
at least one processor, coupled to said memory and said interface, and operative to:
cause first and second computer display devices associated with first and second ones of the remote client computing devices to each display first and second avatars in at least one of a virtual reality environment and an augmented reality environment, said first and second avatars representing first and second human users of the first and second remote client computing devices;
creating and storing a pre-agreed gesture sequence in a database for at least one of said virtual reality environment and said augmented reality environment during a pre-registration step, to be used as a predetermined gesture sequence, wherein a sequence of gestures defined by said first human user and said second human user is used as the predetermined gesture sequence;
obtaining data indicating that said predetermined gesture sequence has occurred between said first and second avatars;
in reliance on said data indicating that said predetermined gesture sequence has occurred between said first and second avatars, cause the authentication/transaction management server to take at least one action outside said at least one of said virtual reality environment and said augmented reality environment; and
cause a confirmation at the first and second ones of the remote client computing devices, of said action taken in reliance on said data indicating that said predetermined gesture sequence has occurred;
wherein the sequence of gestures defined by said first human user and said second human user to be used as the predetermined gesture sequence comprises said first and second avatars engaging in different gestures and wherein, in said step of obtaining said data indicating that said predetermined gesture sequence has occurred, said predetermined gesture sequence comprises said first and second avatars engaging in the different gestures.

17. A method comprising:
obtaining, from a remote virtual/augmented reality environment management server, at a client computing device having an associated computer display device, instructions causing said computer display device to display first and second avatars in at least one of a virtual reality environment and an augmented reality environment, said first and second avatars respectively representing a human user of said client computing device and a remote human user in said at least one of a virtual reality environment and an augmented reality environment;

creating and storing a pre-agreed gesture sequence in a database for at least one of said virtual reality environment and said augmented reality environment during a pre-registration step, to be used as a predetermined gesture sequence, wherein a sequence of gestures defined by said first human user and said second human user is used as the predetermined gesture sequence;

providing, to said remote virtual/augmented reality environment management server, from said client computing device, at least a portion of data indicating that said predetermined gesture sequence has occurred between said first and second avatars, to cause said remote virtual/augmented reality environment management server, in reliance on said at least portion of data indicating that said predetermined gesture sequence has occurred between said first and second avatars, to in turn cause an authentication/transaction management server to take at least one action outside said at least one of said virtual reality environment and said augmented reality environment;

obtaining, from said remote virtual/augmented reality environment management server, at said client computing device, a confirmation of said action taken in reliance on said data indicating that said predetermined gesture sequence has occurred; and providing to said human user of said client computing device, based on said confirmation, at least one of a visual indication, an audio indication, and a haptic indication;

wherein the sequence of gestures defined by said first human user and said second human user to be used as the predetermined gesture sequence comprises said first and second avatars engaging in different gestures and wherein, in said step of providing, to said virtual/augmented reality environment management server, said at least portion of data indicating that said predetermined gesture sequence has occurred, said predetermined gesture sequence comprises said first and second avatars engaging in the different gestures.

18. A client computing device comprising:

a memory; and at least one processor, coupled to said memory, and operative to:

obtain, from a remote virtual/augmented reality environment management server, instructions causing a computer display device associated with said client computing device to display first and second avatars in at least one of a virtual reality environment and an augmented reality environment, said first and second avatars respectively representing a human user of said client computing device and a remote human user in said at least one of a virtual reality environment and an augmented reality environment;

create and store a pre-agreed gesture sequence in a database for at least one of said virtual reality environment and said augmented reality environment during a pre-registration step, to be used as a predetermined gesture sequence, wherein a sequence of gestures defined by said first human user and said second human user is used as the predetermined gesture sequence;

provide, to said remote virtual/augmented reality environment management server, from said client computing device, at least a portion of data indicating that said predetermined gesture sequence has occurred between said first and second avatars, to cause said remote virtual/augmented reality environment management server, in reliance on said at least portion of data indicating that said predetermined gesture sequence has occurred between said first and second avatars, to in turn cause an authentication/transaction management server to take at least one action outside said at least one of said virtual reality environment and said augmented reality environment;

obtain, from said remote virtual/augmented reality environment management server, at said client computing device, a confirmation of said action taken in reliance on said data indicating that said predetermined gesture sequence has occurred; and provide to said human user of said client computing device, based on said confirmation, at least one of a visual indication, an audio indication, and a haptic indication;

wherein the sequence of gestures defined by said first human user and said second human user to be used as the predetermined gesture sequence comprises said first and second avatars engaging in different gestures and wherein, in said step of providing, to said virtual/augmented reality environment management server, said at least portion of data indicating that said predetermined gesture sequence has occurred, said predetermined gesture sequence comprises said first and second avatars engaging in the different gestures.

* * * * *